(12) United States Patent
Kosugi et al.

(10) Patent No.: US 8,155,897 B2
(45) Date of Patent: Apr. 10, 2012

(54) TEST APPARATUS, TRANSMISSION SYSTEM, PROGRAM, AND RECORDING MEDIUM

(75) Inventors: Masaaki Kosugi, Gunma (JP); Kazumoto Tamura, Gunma (JP)

(73) Assignee: Advantest Corporation, Tokyo (JP)

( * ) Notice: Subject to any disclaimer, the term of this patent is extended or adjusted under 35 U.S.C. 154(b) by 698 days.

(21) Appl. No.: 12/335,550

(22) Filed: Dec. 16, 2008

(65) Prior Publication Data

US 2010/0153034 A1    Jun. 17, 2010

(51) Int. Cl.
*G06F 13/00* (2006.01)
*G06F 11/26* (2006.01)

(52) U.S. Cl. .......... 702/58; 702/108; 702/122; 702/124; 714/712

(58) Field of Classification Search .................. 702/58, 702/108, 122, 124
See application file for complete search history.

(56) References Cited

U.S. PATENT DOCUMENTS

| | | | | |
|---|---|---|---|---|
| 5,251,211 A | * | 10/1993 | Mutoh et al. | 370/445 |
| 5,414,717 A | * | 5/1995 | Matsumoto et al. | 714/748 |
| 5,629,948 A | * | 5/1997 | Hagiwara et al. | 714/748 |
| 5,825,749 A | * | 10/1998 | Terayama et al. | 370/244 |

FOREIGN PATENT DOCUMENTS

| | | |
|---|---|---|
| JP | 64-041537 | 2/1989 |
| JP | 2004-297442 | 10/2004 |
| JP | 2005-039360 | 2/2005 |
| JP | 2006-517026 | 7/2006 |

OTHER PUBLICATIONS

"Search Report of PCT Counterpart Application" issued on Mar. 9, 2010, p. 1-p. 6.
"Form PCT/IB/338, PCT/IB/373, PCT/ISA/237 of PCT counterpart application", issued on Jul. 14, 2011, p. 1-p. 5.

* cited by examiner

*Primary Examiner* — Hal Wachsman
(74) *Attorney, Agent, or Firm* — Jianq Chyun IP Office

(57) ABSTRACT

Provided is a semiconductor test apparatus that tests a device under test, comprising a test unit that tests a device under test; and a serial transmitting section that transmits transmission data back and forth between the test unit and a control section controlling the test unit. The serial transmitting section includes a data sending section that sends a plurality of pieces of the transmission data in a predetermined order; a resending control section that resends the transmission data; and an expected acknowledgement ID storage section that stores an expected acknowledgement ID indicating identification data that is expected to be attached to an acknowledgement signal received on a transmission side. The resending control section judges whether resending is necessary based on (i) whether resend count information indicates that a piece of transmission data is resent data and (ii) the expected acknowledgment ID in the expected acknowledgement ID storage section.

22 Claims, 16 Drawing Sheets

TEST APPARATUS, TRANSMISSION SYSTEM, PROGRAM, AND RECORDING MEDIUM

BACKGROUND

1. Technical Field

The present invention relates to a test apparatus, a serial transmission system, a program, and a recording medium.

2. Related Art

A semiconductor test apparatus is provided with a plurality of test modules. Each test module sends and receives testing data to and from another test module or to and from a performance board on which is mounted a device under test. The test modules perform data transmission using a high speed serial bus, with the objective of transmitting large amounts of data in a short amount of time.

A high degree of reliability is desired in the communication between test modules in the semiconductor test apparatus, such as a bit error rate in a range from approximately $10^{-17}$ to $10^{-19}$. Despite this, recent increases in transmission speed have been accompanied by an increase in the bit error rate. A known technique for improving reliability of the transmission path involves framing the transmission data and using a resend control to resend a frame in which a bit error occurs.

The transmission side is controlled by a CPU or the like to resend transmission data that was not received successfully, thereby ensuring successful transmission of all of the data. If an acknowledgement signal is lost in the transmission path, however, it takes a long time to detect that a resending is necessary. As a result, there is a problem that a large buffer size and circuit size are needed to store the data over a long period.

SUMMARY

Therefore, it is an object of an aspect of the innovations herein to provide a test apparatus, serial transmission system, a program, and a recording medium, which overcome the above drawbacks accompanying the related art. The above and other objects can be achieved by combinations described in the independent claims. The dependent claims define further advantageous and exemplary combinations of the innovations herein.

According to a first aspect related to the innovations herein, one exemplary test apparatus may include a test apparatus that tests a device under test, comprising a test unit that is electrically connected to the device under test and tests the device under test; a control section that controls the test unit; and a serial transmitting section that transmits transmission data back and forth between the control section and the test unit. The serial transmitting section includes a data sending section, provided on a transmission side, that sends a plurality of pieces of the transmission data in a predetermined order; a reception notifying section that, when a piece of the transmission data is received on a reception side, attaches identification data to an acknowledgement signal indicating that the piece of transmission data has been received, and sends the acknowledgement signal to the transmission side; a resending control section that, when a reception order of pieces of transmission data as indicated by the acknowledgement signals differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and an expected acknowledgement ID storage section that stores an expected acknowledgement ID indicating the identification data that is expected to be attached to the acknowledgement signal received on the transmission side. The reception notifying section attaches, to the acknowledgement signal to be sent in response to the received piece of transmission data, the resend count information of the piece of transmission data, and sends the acknowledgement signal to the transmission side. When the reception order of a piece of transmission data as indicated by the acknowledgment signal differs from the predetermined order, the resending control section does not resend the piece of transmission data if (i) the resend count information indicates that the piece of transmission data is resent data and (ii) the identification data attached to the acknowledgment signal is the same as the expected acknowledgement ID.

According to a second aspect related to the innovations herein, one exemplary serial transmission system may comprise a data sending section, provided on a transmission side, that sends a plurality of pieces of transmission data in a predetermined order; a reception notifying section that, when a piece of the transmission data is received on a reception side, attaches identification data to an acknowledgement signal indicating that the piece of transmission data has been received, and sends the acknowledgement signal to the transmission side; a resending control section that, when a reception order of the pieces of transmission data as indicated by the acknowledgement signals differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and an expected acknowledgement ID storage section that stores an expected acknowledgement ID indicating the identification data that is expected to be attached to the acknowledgement signal received on the transmission side. The reception notifying section attaches, to the acknowledgement signal to be sent in response to the received piece of transmission data, the resend count information of the piece of transmission data, and sends the acknowledgement signal to the transmission side. When the reception order of the piece of transmission data as indicated by the acknowledgement signal differs from the predetermined order, the resending control section does not resend the piece of transmission data if (i) the resend count information indicates that the piece of transmission data is resent data and (ii) the acknowledgement data attached to the acknowledgment signal is the same as the expected acknowledgement ID.

According to a third aspect related to the innovations herein, one exemplary recording medium and program may include a recording medium storing thereon a program that causes a test apparatus to test a device under test. The program causes the test apparatus to function as a test unit that is electrically connected to the device under test and tests the device under test; a control section that controls the test unit; and a serial transmitting section that transmits transmission data back and forth between the control section and the test unit. The program causes the serial transmitting section to function as a data sending section, provided on a transmission side, that sends a plurality of pieces of the transmission data in a predetermined order; a reception notifying section that, when a piece of the transmission data is received on a reception side, attaches identification data to an acknowledgement signal indicating that the piece of transmission data has been received, and sends the acknowledgement signal to the transmission side; a resending control section that, when a reception order of the pieces of transmission data as indicated by the acknowledgement signals differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and an expected acknowledgement ID storage section that stores an expected acknowledgement ID indicating the identification data that is expected to be attached to the acknowledgement signal received on the transmission side. The program causes the reception notifying section to attach, to the acknowledgement signal to be sent in response to the received piece of transmission data, the resend count information of the piece of transmission data, and sends the acknowledgement signal to the transmission side. When the reception order of the piece of transmission data as indicated by the acknowledgment signal differs from the predetermined order, the program causes the resending control section to not resend the piece of transmission data if (i) the resend count information indicates that the piece of transmission data is resent data and (ii) the acknowledgement data attached to the acknowledgment signal is the same as the expected acknowledgement ID.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
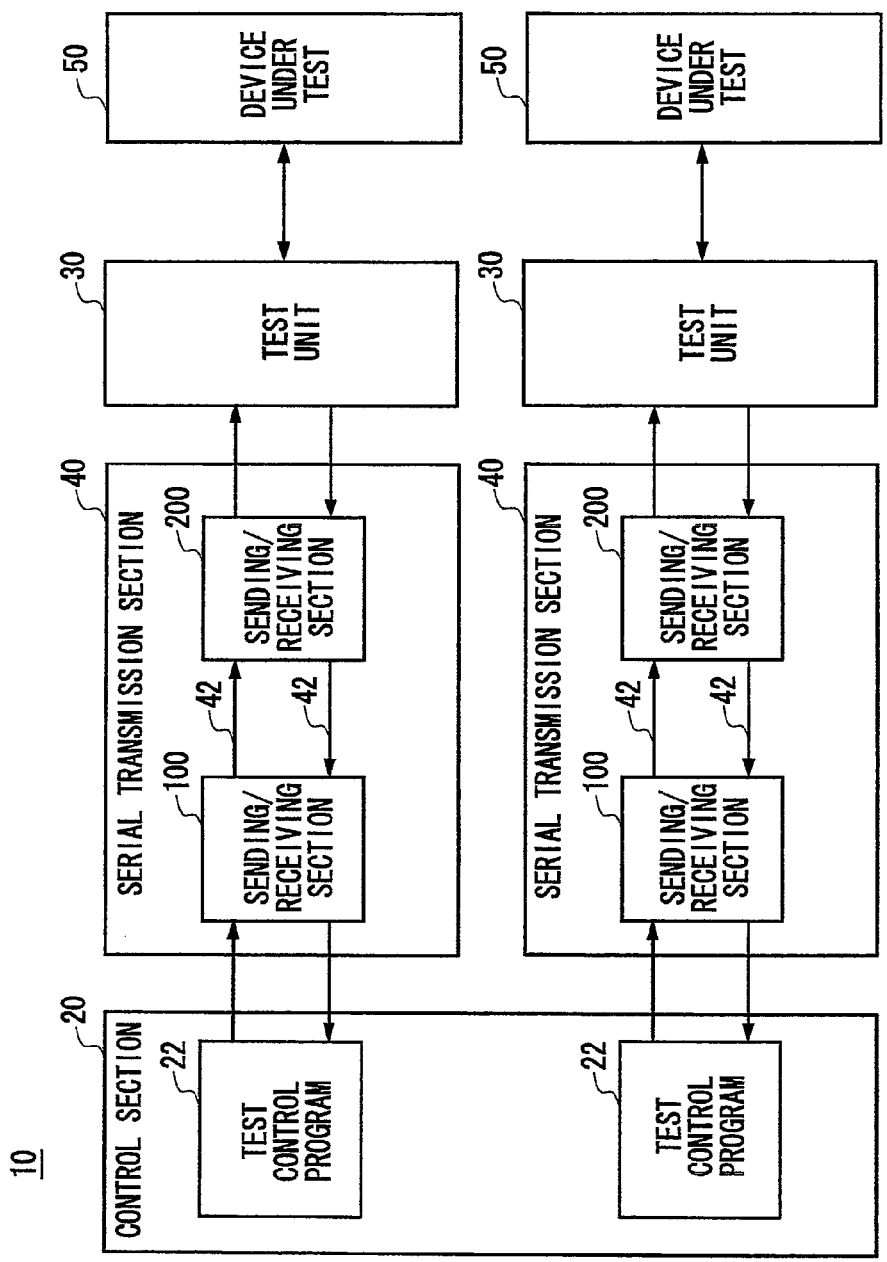
FIG. 1 shows an exemplary configuration of a semiconductor test apparatus 10 according to an embodiment of the present invention, along with devices under test 50.

FIG. 1 shows an exemplary configuration of a semiconductor test apparatus 10 according to an embodiment of the present invention, along with devices under test 50. The semiconductor test apparatus 10 is provided with a control section 20, a plurality of test units 30, and a plurality of serial transmitting sections 40. The control section 20 executes a plurality of test control programs 22 or the like supplied in advance, so as to control the plurality of test units 30 to test the plurality of devices under test 50. The control section 20 may be a CPU.

The plurality of test units 30 are provided to correspond to the plurality of devices under test 50 or to the pins of the plurality of devices under test 50. The control section 20 may control the test units 30 to test the devices under test 50 in parallel. Each test unit 30 is electrically connected to a device under test 50 to test the device under test 50. Each test unit 30 may generate data to be used for testing the corresponding device under test 50, and may analyze the data output by the device under test 50.

Each serial transmitting section 40 includes a transmission medium 42, a sending/receiving section 100, and a sending/receiving section 200. The sending/receiving section 100 may be provided at an end of the transmission medium 42 on the control section 20 side. The sending/receiving section 200 may be provided at an end of the transmission medium 42 on the test unit 30 side. For example, the sending/receiving section 100 and the sending/receiving section 200 send transmission data back and forth between the control section 20 and the corresponding test unit 30 via the transmission medium 42.

When data cannot be successfully transmitted back and forth between the control section 20 and the corresponding test unit 30, the sending/receiving section 100 and the sending/receiving section 200 can recover the transmission data without performing control via the control section 20. In this way, when a transmission error occurs, the transmission data can be recovered without increasing the load on the control section 20 performing multiple tasks. The sending/receiving sections 100 and the sending/receiving sections 200 may use hardware to detect a transmission error and recover the transmission data.

Figure 2:
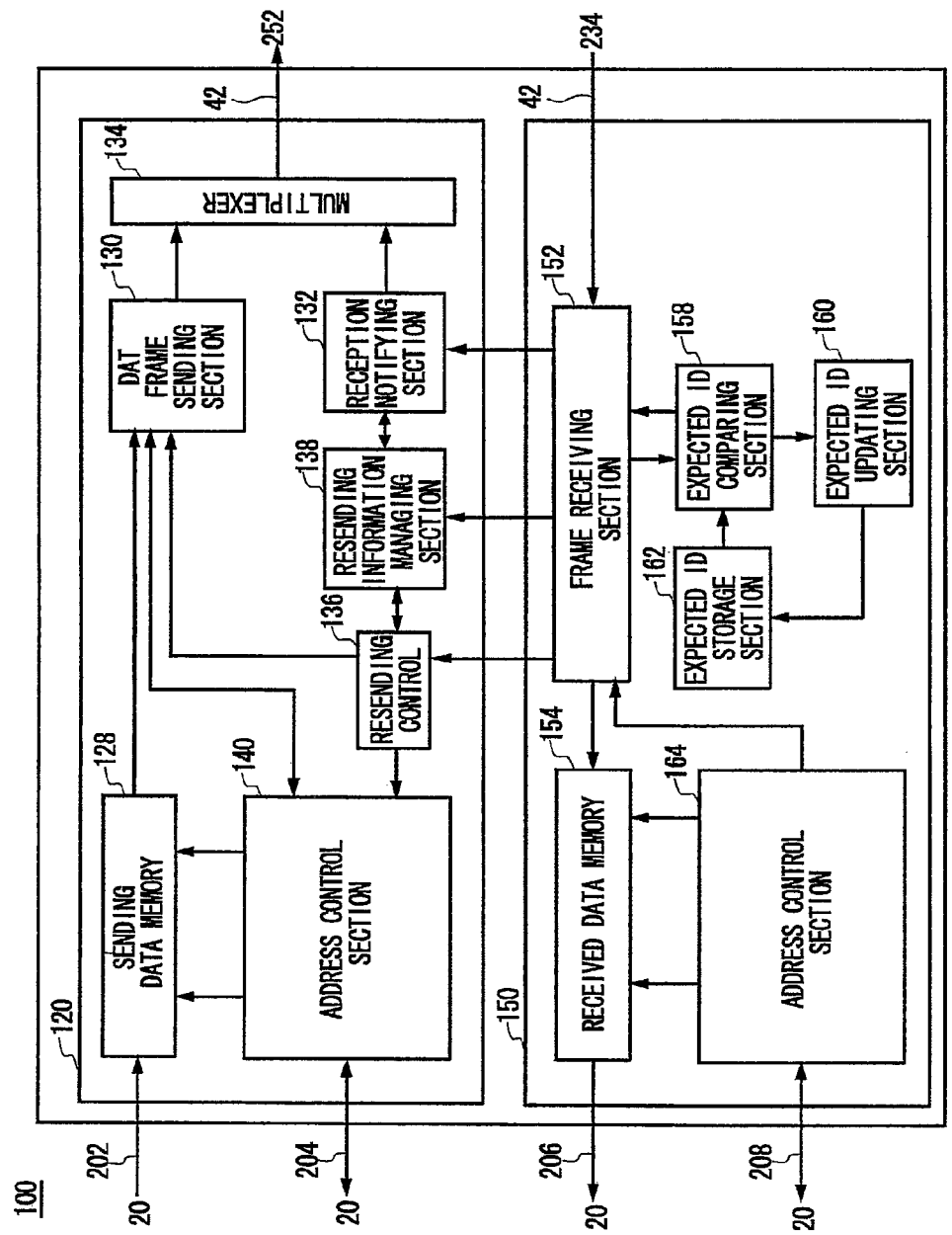
FIG. 2 shows a configuration of a sending/receiving section 100 on a transmission side according to the present embodiment.

FIG. 2 shows a configuration of the sending/receiving section 100 on a transmission side according to the present embodiment. Upon receiving transmission data, the sending/receiving section 100 according to the present embodiment notifies a partner that the transmission data is received. Having received the transmission data, the sending/receiving section 100 resends the transmission data if the transmission data was not received in a prescribed order.

The sending/receiving section 100 of FIG. 2 includes a data sending section 120 and a data receiving section 150. The data sending section 120 and the data receiving section 150 control the sending and receiving of transmission frames between the sending/receiving section 100 and the sending/receiving section 200. In the present embodiment, the transmission frame is exemplified by a frame-type including transmission data such as a test pattern (referred to hereinafter as a "DAT frame") and a frame-type that includes an acknowledgement signal indicating that the transmission data is received (referred to hereinafter as an "ACK frame").

When the transmission data is sent from the sending/receiving section 100 to the sending/receiving section 200, the data sending section 120 sends a DAT frame including the transmission data to the sending/receiving section 200. When the sending/receiving section 100 receives a DAT frame from the sending/receiving section 200, the data sending section 120 sends an ACK frame in response to the DAT frame. The sending/receiving section 100 may attach identification data (referred to hereinafter as a "frame ID") to the sent DAT frame, and may attach a frame ID of a received DAT frame to the ACK frame sent in response to this DAT frame.

The data sending section 120 includes a sending data memory 128, a DAT frame sending section 130, a reception notifying section 132, a multiplexer 134, a resending control section 136, a resending information managing section 138, and an address control section 140. The data sending section 120 sends a plurality of pieces of transmission data in a predetermined order. The data sending section 120 may change the frame ID attached to each piece of sequentially sent transmission data according to a predetermined rule. For example, the data sending section 120 may attach to each piece of transmission data a frame ID that includes a number that increases incrementally for each piece of transmission data.

The data receiving section 150 includes a frame receiving section 152, a received data memory 154, an expected ID comparing section 158, an expected ID updating section 160, an expected ID storage section 162, and an address control section 164. The frame receiving section 152 acquires the frame ID included in a DAT frame. The frame receiving section 152 identifies the frame-type based on a frame code included in the DAT frame received by the sending/receiving section 200. When the received transmission data is an ACK frame, the frame receiving section 152 may output the transmission data included in the received ACK frame to the resending control section 136. When the received transmission frame is a DAT frame, the frame receiving section 152 may convert the transmission data included in the received DAT frame into parallel data, and output the parallel data to the received data memory 154.

The expected ID storage section 162 stores an expected ID indicating the frame ID that should be attached to the transmission frame received by the frame receiving section 152. The expected ID comparing section 158 compares the frame ID attached to the received transmission data with the expected ID stored by the expected ID storage section 162.

When the frame ID attached to the transmission data received by the frame receiving section 152 is the same as the expected ID stored in the expected ID storage section 162, the expected ID updating section 160 updates the expected ID stored in the expected ID storage section 162 according to a predetermined rule. The expected ID updating section 160 desirably changes the expected ID according to the same rule used by the data sending section 120 to change the frame ID.

The frame receiving section 152 notifies the expected ID comparing section 158 concerning the frame ID included in the received transmission data, and judges whether the data sent by the sending/receiving section 200 was received successfully by acquiring the comparison result output by the expected ID comparing section 158.

The expected ID storage section 162 may store an expected frame ID for each frame-type. For example, the expected ID storage section 162 may function as an expected data ID storage section that stores an expected DAT_ID for a DAT frame, or may function as an expected acknowledgement ID storage section that stores an expected ACK_ID for an ACK frame. The expected ID storage section 162 may update the stored expected values under the control of the expected ID updating section 160.

The expected ID comparing section 158 compares the frame ID attached to the transmission data received by the frame receiving section 152 with the expected ID value stored in the expected ID storage section 162. The expected ID comparing section 158 may compare the frame ID with the expected ID value for each frame-type. For example, the expected ID comparing section 158 may function as an expected data ID comparing section that compares the frame ID with the expected DAT_ID for each DAT frame, or may function as an expected acknowledgement ID comparing section that compares the frame ID with the expected ACK frame ID for each ACK frame.

The expected ID updating section 160 receives the comparison result from the expected ID comparing section 158. If the frame ID attached to the transmission data received by the frame receiving section 152 is the same as the expected ID stored in the expected ID storage section 162, the expected ID updating section 160 updates the expected ID stored by the expected ID storage section 162 according to the predetermined rule. The expected ID updating section 160 may update the expected ID for each frame-type. For example, the expected ID updating section 160 may function as an expected data ID updating section that updates an expected DAT_ID for each DAT frame, or may function as an expected acknowledgement ID updating section that updates an expected ACK_ID for each ACK frame.

The expected ID updating section 160 may update the expected IDs by increasing the value of the frame ID by 1 each update. More specifically, if the frame ID of an ACK frame received by the frame receiving section 152 from the sending/receiving section 200 has a value of 2, the value of the frame ID of the next received ACK frame should be 3. Accordingly, the expected ID storage section 162 stores 3 as the value of the expected ACK ID to be received.

In this state, if the value of the frame ID of the ACK frame received by the frame receiving section 152 is 3, the expected ID comparing section 158 notifies the expected ID updating section 160 that the comparison result indicates a match. When the comparison result indicates a match, the expected ID updating section 160 may instruct the expected ID storage section 162 to update the stored expected ACK_ID to have a value of 4. The expected ID storage section 162 updates the stored expected ACK_ID to have a value of 4 based on the instructions of the expected ID updating section 160.

On the other hand, if the value of the frame ID of the ACK frame received by the frame receiving section 152 is not 3, the expected ID comparing section 158 notifies the expected ID updating section 160 that the comparison result indicates a difference. When the comparison result indicates a difference, the expected ID updating section 160 does not supply the expected ID storage section 162 with instructions to update the stored expected ACK_ID.

The expected ID comparing section 158 may notify the frame receiving section 152 concerning the comparison result. The resending control section 136 may order a resend based on the comparison result by the expected ID comparing section 158 received via the frame receiving section 152.

The control section 20 is connected to the sending data memory 128 via a data line 202, and is connected to the address control section 140 via a control line 204. In the same way, the control section 20 is connected to the received data memory 154 via a data line 206, and is connected to the address control section 164 via a control line 208. The control section 20 may write the data being sent onto the sending data memory 128 via the data line 202. The control section 20 may read the received data stored in the received data memory 154 via the data line 206.

The following describes the detailed operation of the data sending section 120. The sending data memory 128 stores the transmission data being sent. The sending data memory 128 has a plurality of addresses. The sending data memory 128 writes the transmission data supplied from the control section 20 onto a writable address, and outputs transmission data from an address designated by a read address output by the address control section 140. The sending data memory 128 may be a dual port memory. The sending data memory 128 may simultaneously (i) write the transmission data onto a write address output by the address control section 140 and (ii) read transmission data from a read address output by the address control section 140.

The DAT frame sending section 130 converts the transmission data read from the sending data memory 128 into serial data. According to instructions from the resending control section 136, the DAT frame sending section 130 attaches a frame ID to the transmission data read from the sending data memory 128 and then generates a prescribed DAT frame. The DAT frame sending section 130 may also attach an FCS (Frame Check Sequence) to the DAT frame. The DAT frame sending section 130 may output the generated DAT frame to the multiplexer 134.

Upon receiving transmission data from the sending/receiving section 200, the reception notifying section 132 generates an ACK frame indicating that this transmission data has been received, and outputs the ACK frame to the multiplexer 134. The reception notifying section 132 may also send the ACK frame to the sending/receiving section 200 in response to a DAT frame that is received several times from the sending/receiving section 200. In other words, when a plurality of the same DAT frame are received from the sending/receiving section 200, the reception notifying section 132 may send ACK frames corresponding to each of these DAT frames. The multiplexer 134 sends the DAT frames output by the DAT frame sending section 130 and the ACK frames output by the reception notifying section 132 to the sending/receiving section 200.

The resending control section 136 controls the transmission order of the DAT frames sent to the sending/receiving section 200. The resending control section 136 may notify the DAT frame sending section 130 concerning the frame IDs of the DAT frames sent to the sending/receiving section 200.

If the reception order of the transmission data shown by the ACK frames received in response to the DAT frames sent to the sending/receiving section 200 differs from a predetermined order, the resending control section 136 executes control to resend the data from the transmission data whose reception order differed from the predetermined reception order. The resending control section 136 may resend the DAT frames by notifying the DAT frame sending section 130 concerning the frame IDs of the DAT frames to be resent.

For example, assume that the frame IDs of the DAT frames sequentially sent from the sending/receiving section 100 to the sending/receiving section 200 have values of 1, 2, 3, 4, 5. In this case, if the frame IDs indicated by the ACK frames received by the sending/receiving section 100 from the sending/receiving section 200 have values of 1, 2, 4, 5, that is, the frame ID whose value should be 3 instead has a value of 4, the frame IDs are understood to be received in an order differing from the predetermined order. In this situation, the resending control section 136 may resend the DAT frames from the DAT frame with a frame ID value of 3 (referred to hereinafter as "frame ID 3") and onward.

If the data sending section 120 is not provided with the next piece of transmission data to be sent, the resending control section 136 may control the DAT frame sending section 130 to continue resending the most recently sent piece of transmission data to the sending/receiving section 200 until the data sending section 120 is provided with the next piece of transmission data to be sent. For example, the DAT frame sending section 130 may sequentially send DAT frames with the frame IDs 1, 2, 3, 3, 3.

When the reception order of a DAT frame as indicated by the ACK frame is different from the predetermined order and the DAT frame corresponding to the ACK frame is judged to be different from the DAT frame corresponding to the expected ACK_ID, the resending control section 136 resends the DAT frame. When resending the DAT frame, the resending control section 136 may control the DAT frame sending section 130 to send the DAT with attached resend count information, which indicates that the associated DAT frame is a resent frame. For example, the resend count information may have a value of 0 when sending a DAT frame for the first time, and may have a value of 1 when a DAT frame is resent. Upon receiving a DAT frame to which resend count information is attached, the reception notifying section 132 may send an ACK frame to which the same resend count information is attached.

The resending control section 136 may control the resending based on the frame ID and the resend count information included in the received ACK frame. For example, if the frame ID included in the received ACK frame has a value that is 1 greater than the value of the frame ID included in the ACK framed received immediately before, the resending control section 136 does not perform the resending.

Even if the reception order of a DAT frame received by the sending/receiving section 200 differs from the predetermined order, the resending control section 136 need not resend the DAT frame as long as (i) the resend count information included in the ACK frame received from the sending/receiving section 200 indicates data being resent and (ii) the frame ID attached to the ACK frame is the same as the expected acknowledgement ID (referred to hereinafter as the "expected ACK_ID"). For example, assume that the predetermined order for the frame IDs is 1, 2, 3, 4, 5 and that the frame IDs indicated by the ACK frames received by the sending/receiving section 100 from the sending/receiving section 200 are 1, 2, 4, 5. Here, the ACK frame indicating the frame ID 4 (referred to hereinafter as "ACK frame 4") is received out of order, such that frame ID 3 is skipped.

In this case, if (i) the resend count information attached to the received ACK frame 4 has a value of 1, indicating a resent frame, and (ii) the frame ID 4 is equal to the expected acknowledgment ID value of 4 stored in the expected ID storage section 162, the resending control section 136 may judge that the resent DAT frame 4 has successfully reached the sending/receiving section 200. In this case, the resending control section 136 need not resend DAT frame 4.

On the other hand, if the reception order of the transmission data indicated by the ACK frame differs from the predetermined order and the frame ID attached to the ACK frame is not the same as the expected ACK_ID stored in the expected ID storage section 162, the resending control section 136 may judge that the transmission data must be resent. For example, assume that the predetermined order for the frame IDs is 1, 2, 3, 4, 5 but the frame IDs indicated by the ACK frames are 1, 2, 4, 5. Here, ACK frame 4 differs from the predetermined order, such that frame ID 3 is skipped. In this case, if the expected ID storage section 162 stores a value of 3 as the expected ACK_ID, the resending control section 136 judges that the frame ID 4 indicated by the received ACK frame 4 differs from the expected ACK_ID value of 3. Accordingly, the resending control section 136 judges that DAT frame 3 must be resent.

The resend count information may indicate the number of times that a certain DAT frame has been resent. Since the resend count information indicates the number of resends, the transmission data can be resent even if a data error occurs a plurality of times in a single DAT frame.

More specifically, assume that the frame IDs of the DAT frames sequentially sent to the sending/receiving section 200 by the sending/receiving section 100 have values of 1, 2, 3, 2R, 3R. Here, 2R and 3R indicate resent frames of the DAT frames having frame IDs of 2 and 3, respectively. In this case, if the frame IDs indicated by the ACK frames received by the sending/receiving section 100 from the sending/receiving section 200 have values of 1, 2, 3, 3R, the resending control section 136 judges that the reception order differs from the predetermined order of 1, 2, 3, 2R, 3R. Furthermore, the resending control section 136 judges that the frame ID 3 of the received frame 3R differs from the expected ACK_ID, and the resending control section 136 may therefore resend DAT frame 2. Since DAT frame 2 has been resent twice at this point, the resending information managing section 138 may update the resend count information of DAT frame 2 to a value of 2.

When the sending/receiving section 100 receives an ACK frame indicating that a DAT frame is received and having a value corresponding to the expected ACK_ID value, the resending control section 136 may reset the number of resends indicated by the resend count information stored in the resending information managing section 138 to the initial value. For example, assume that the data sending section 120 resends a DAT frame with a frame ID 3 and a resend count information value of 2 to the sending/receiving section 200. In this case, if the sending/receiving section 100 receives ACK frame 3R from the sending/receiving section 200, the frame ID 3 in the received ACK frame 3R is equal to the expected ACK_ID value 3, and therefore the sending/receiving section 100 may judge that the DAT frame has been received successfully by the sending/receiving section 200. Here, the resending control section 136 may reset the resend count information to a value of 0.

If the number of resends displayed by the resend count information in a received ACK frame is greater than a predetermined threshold value, the sending/receiving section 100 may stop the transmission of the corresponding DAT frame. When the number of resends exceeds the prescribed number, the sending/receiving section 100 may stop sending the corresponding DAT frame and notify the control section 20 that the sending has been stopped.

When the reception order of an ACK frame received by the sending/receiving section 200 is the predetermined order, the address control section 140 may control the address of the sending data memory 128 at which is stored the transmission data received with the DAT frame corresponding to the ACK frame to be a writable address. In other words, upon acknowledging that the transmission data stored in the sending data memory 128 has been received by the sending/receiving section 200, the address control section 140 may write different data onto the address at which this transmission data is stored.

When the frame ID of a received DAT frame is different from the frame ID determined according to the predetermined rule, the frame receiving section 152 stops the output of the received data to the received data memory 154. Then, if a DAT frame is received having a frame ID determined according to the predetermined rule, the frame receiving section 152 may restart the output of the received data to the received data memory 154. Furthermore, if a DAT frame is again received having a frame ID that is the same as that of the ACK frame received by the reception notifying section 132, the frame receiving section 152 may delete the DAT frame received for a second time.

Furthermore, if notification is received from the expected ID comparing section 158 that the frame ID of the received DAT frame is different from the expected DAT_ID, the frame receiving section 152 may delete the received data without outputting this data to the received data memory 154. If notification is received from the expected ID comparing section 158 that the frame ID of the received DAT frame is the same as the expected DAT_ID, the frame receiving section 152 may output the received data to the received data memory 154.

The received data memory 154 is a buffer storing the received data. The received data memory 154 may be a dual port memory. The received data memory 154 may write the data output by the frame receiving section 152 onto the write address output by the address control section 164. The received data memory 154 may output, to the control section 20, data stored at the read address output by the address control section 164. The serial transmitting section 40 may read the received data stored on the received data memory 154.

Figure 3:
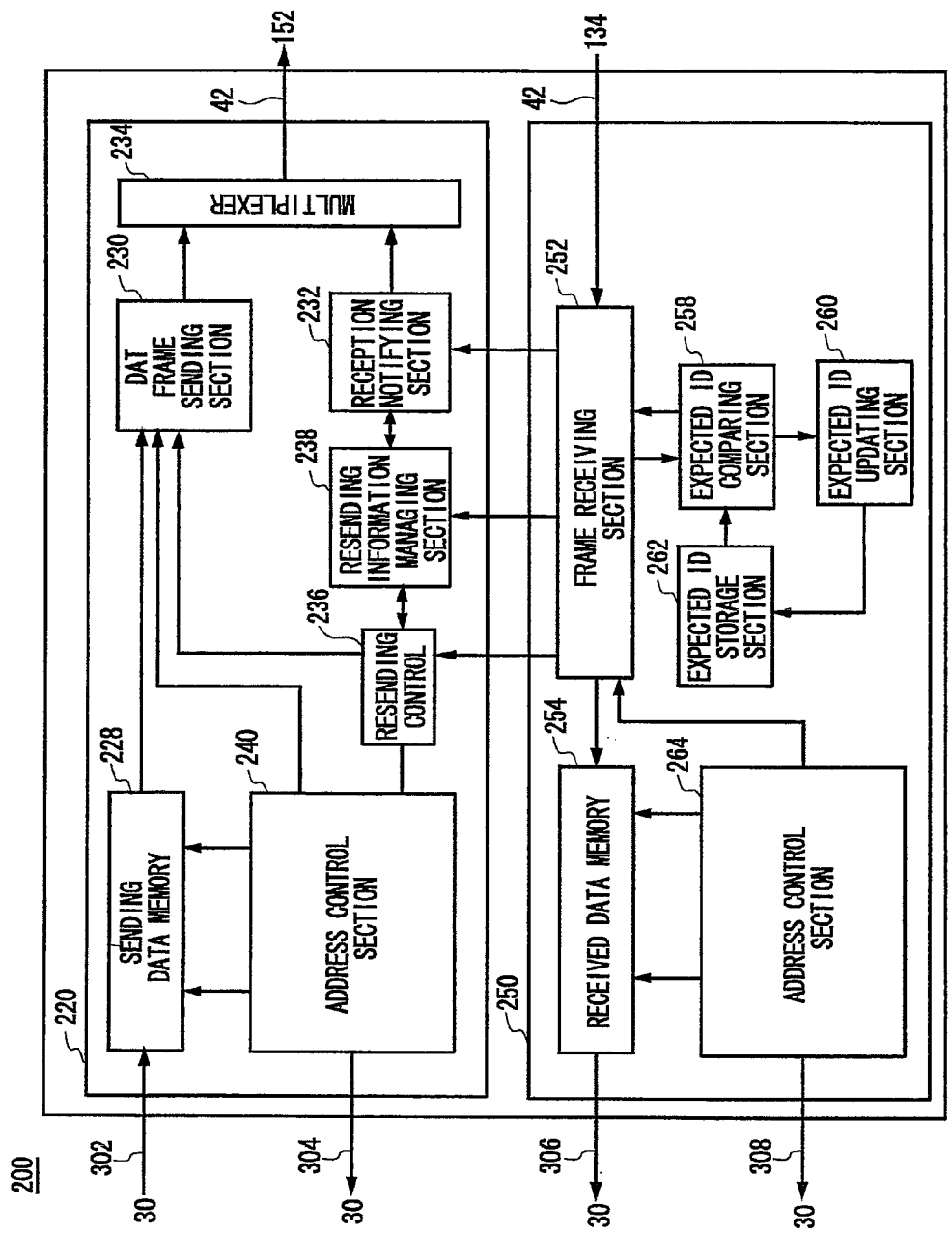
FIG. 3 shows a configuration of the reception-side sending/receiving section 200 according to the present embodiment.

FIG. 3 shows a configuration of the reception-side sending/receiving section 200 according to the present embodiment. The sending/receiving section 200 includes a data sending section 220 and a data receiving section 250. The data sending section 220 includes a sending data memory 228, a DAT frame sending section 230, a multiplexer 234, a reception notifying section 232, a resending control section 236, a resending information managing section 238, and an address control section 240. The data receiving section 250 includes a frame receiving section 252, a received data memory 254, an expected ID comparing section 258, an expected ID updating section 260, an expected ID storage section 262, and an address control section 264. Components in the sending/receiving section 200 corresponding to components in the sending/receiving section 100 may have the same function.

The multiplexer 234 and the frame receiving section 252 are connected to the sending/receiving section 100 to send and receive data to and from the sending/receiving section 100. The sending data memory 228 and the received data memory 254 are connected to a corresponding test unit 30 to send and receive test data to and from the test unit 30. The DAT frame sending section 230 generates a DAT frame having a frame ID after reading the data to be sent from the sending data memory 228.

The reception notifying section 232 sends an ACK frame corresponding to a DAT frame received by the frame receiving section 252. The resending control section 236 controls a sending order of the DAT frames. The expected ID updating section 260 updates the expected ACK_ID and the expected DAT_ID stored in the expected ID storage section 262, based on the comparison result by the expected ID comparing section 258.

Figure 4:
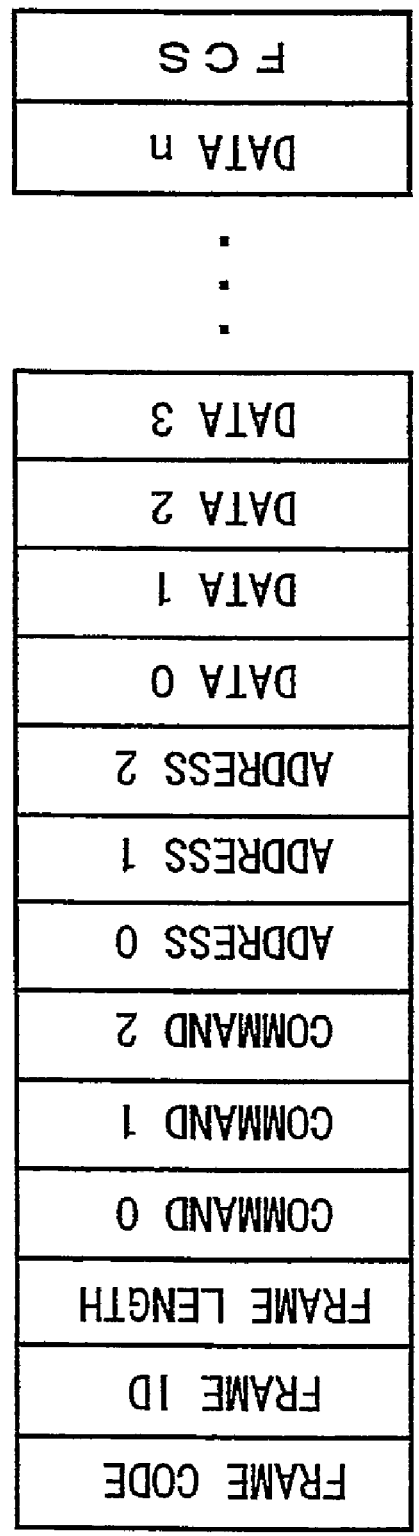
FIG. 4 shows configurations of the DAT frames and ACK frames transmitted back and forth between the sending/receiving section 100 and the sending/receiving section 200.

FIG. 4 shows configurations of the DAT frames and ACK frames transmitted back and forth between the sending/receiving section 100 and the sending/receiving section 200. The frame code includes the resend count information and information indicating a frame-type for distinguishing between DAT frames and ACK frames.

Each frame ID stores number information that identifies a DAT frame and an ACK frame. When the sending/receiving section 100 and the sending/receiving section 200 resend data, the frame ID is referenced. The frame length stores the data length of the frame to be sent. When the length of a piece of received data is not equal to the value indicated by the frame length, the sending/receiving section 100 and the sending/receiving section 200 may judge that an error has occurred in the received data.

Commands 0 to 2 store control information about which the sending/receiving section 100 and the sending/receiving section 200 inform a data transmission partner. For example, when an error occurs in the received data, these commands may store information for requesting a resend. The addresses 0 to 2 may store a sending destination address. When transmission is performed with a plurality of partners, data may be sent storing an address designated for each of the partners. For example, when the sending/receiving section 100 sends data to the sending/receiving section 200, addresses 0 to 2 may store a value of 200.

The data 0 to n stores data to be sent. The data length may be changeable. FCS is a frame check sequence for detecting an error occurring in the transmission medium 42.

Figure 5:
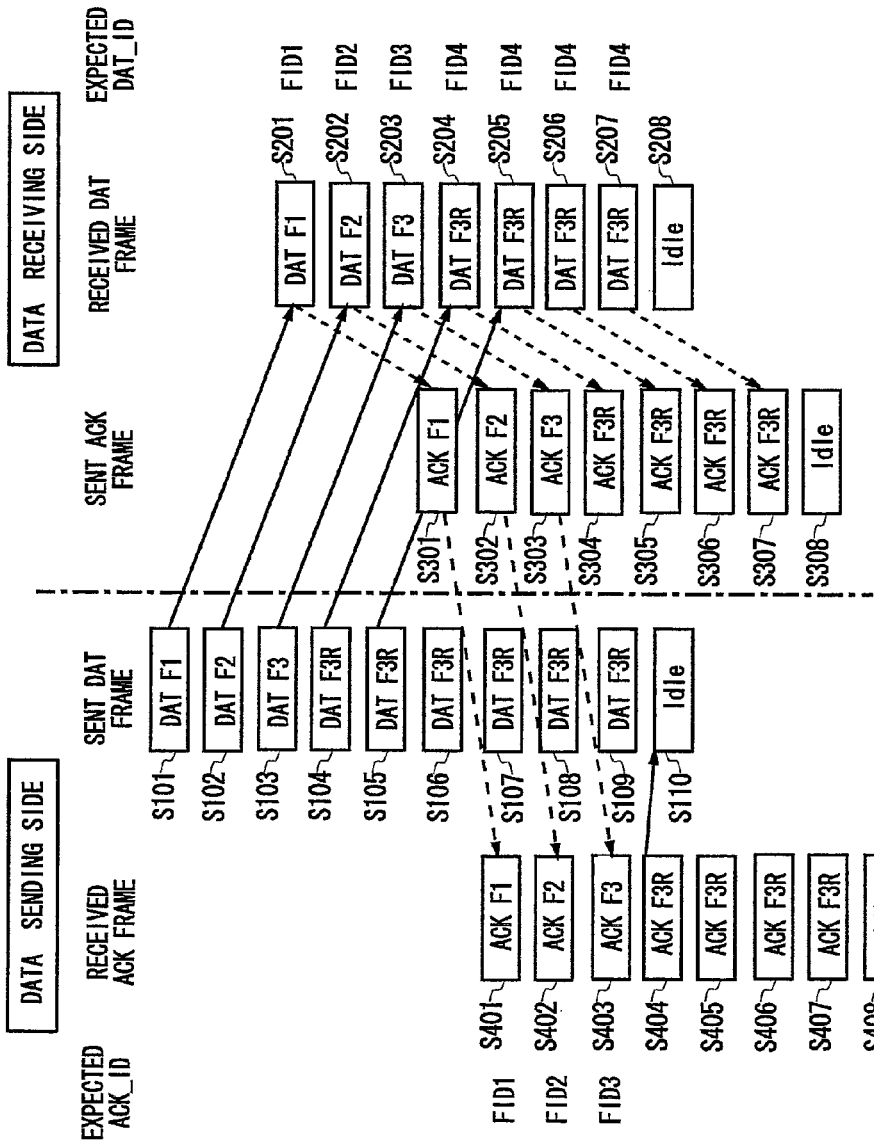
FIG. 5 shows a sequence occurring during successful sending of transmission data from the sending/receiving section 100 to the sending/receiving section 200.

FIG. 5 shows a sequence occurring during successful sending of transmission data from the sending/receiving section 100 to the sending/receiving section 200. The sending/receiving section 100 on the data-transmission side sends DAT frames to the sending/receiving section 200 and receives ACK frames from the sending/receiving section 200. The "expected ACK_ID" is an expected value of the frame ID of an ACK frame received in response to a certain DAT frame being sent, and is stored in the expected ID storage section 162.

The sending/receiving section 200 on the data-reception side receives the DAT frames from the sending/receiving section 100 and sends the ACK frames to the sending/receiving section 100. Here, the "expected DAT_ID" is an expected value of the frame ID of a DAT frame received by the sending/receiving section 200, and is stored in the expected ID storage section 262.

For example, at S101, the sending/receiving section 100 sends DAT frame 1. The sending/receiving section 200 receives DAT frame 1 (S201) and sends ACK frame 1 to the sending/receiving section 100 in response (S301). In this case, the frame ID of the received DAT frame has a value of 1, which is equal to the expected DAT_ID value of 1, and therefore the frame receiving section 252 may output this data to the received data memory 254. Also, the expected ID updating section 260 may increase the value of the expected DAT_ID stored in the expected ID storage section 162 by 1.

The sending/receiving section 100 receives ACK frame 1 sent by the sending/receiving section 200 (S401). The value of the frame ID attached to ACK frame 1 is 1, which is equal to the expected ACK_ID value of 1 stored in the expected ID storage section 162. Therefore, the frame receiving section 252 may judge that the sending/receiving section 200 has successfully received DAT frame 1. Also, the expected ID updating section 160 may increase the value of the expected ACK_ID value stored in the expected ID storage section 162 by 1.

After sending DAT frame 1, the sending/receiving section 100 sends DAT frame 2 and DAT frame 3. The sending/receiving section 100 does not receive transmission data from the control section 20 following DAT frame 3, and therefore, after DAT frame 3 is sent, the sending/receiving section 100 repeatedly sends DAT frame 3R (S104 to S109). DAT frame 3R is a resent frame of a DAT frame with a frame ID value of 3. Upon receiving ACK frame 3 in response to DAT frame 3 (S403), the sending/receiving section 100 judges that sending/receiving section 200 has successfully received DAT frame 3, and may stop the sending of DAT frame 3 (S110).

Figure 6:
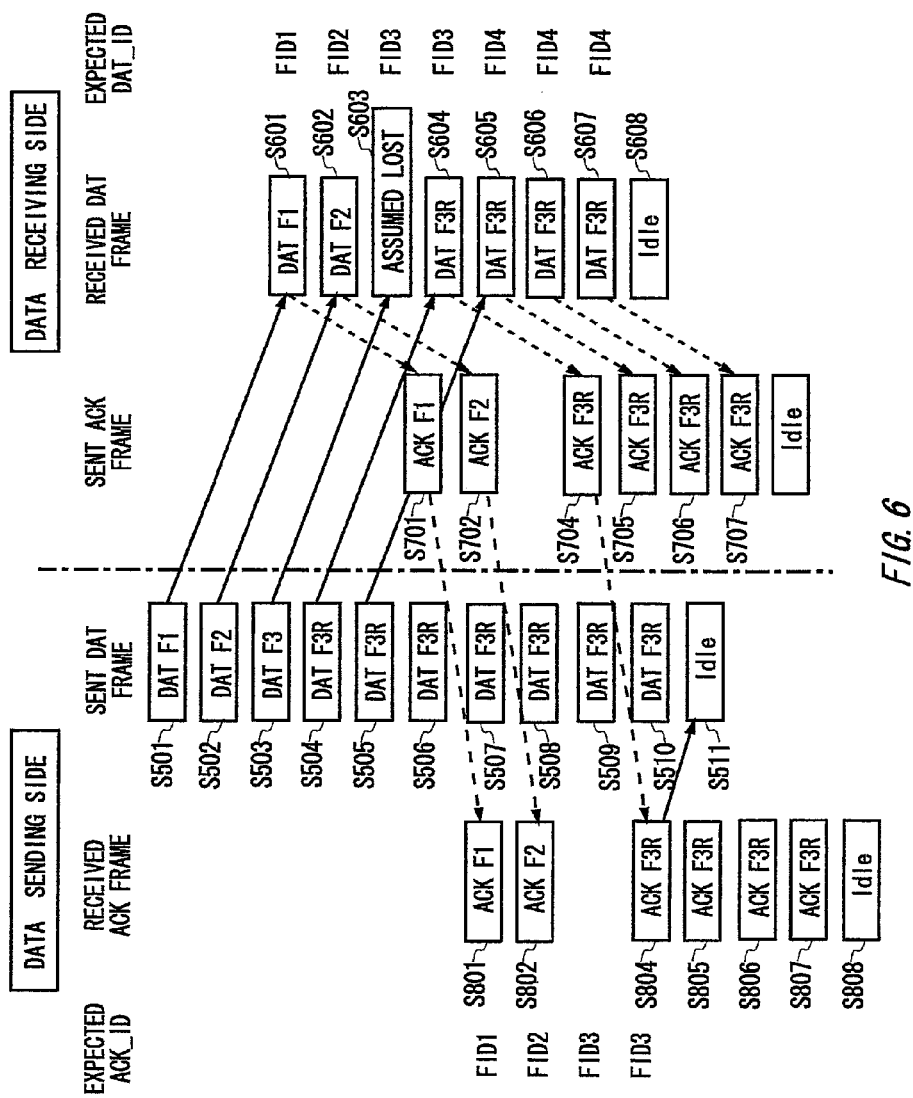
FIG. 6 shows a sequence in which an error occurs during sending of transmission data from the sending/receiving section 100 to the sending/receiving section 200.

FIG. 6 shows a sequence in which an error occurs during sending of transmission data from the sending/receiving section 100 to the sending/receiving section 200. In FIG. 6, it is assumed that DAT frame 3 sent by the sending/receiving section 100 is lost in the transmission medium 42 (S603). The sending/receiving section 200 cannot receive DAT frame 3, and therefore cannot send ACK frame 3. Accordingly, the sending/receiving section 100 cannot receive ACK frame 3 at S803 after receiving ACK frame 2 at S802.

After sending DAT frame 3, the sending/receiving section 100 resends DAT frame 3R from S504 to S510. The sending/receiving section 200 receives the resent DAT frame 3R (S604). The sending/receiving section 200 sends ACK frame 3R that has the frame ID of the received DAT frame 3R (S705).

Since the frame ID 3 of the received DAT frame 3R is equal to the expected DAT_ID 3 stored in the expected ID storage section 262, the sending/receiving section 200 may output the received data to the received data memory 254. Also, the expected ID updating section 260 may increase the expected DAT_ID value stored in the expected ID storage section 262 by 1. The frame receiving section 252 may delete DAT frames 3R received after S604.

The sending/receiving section 100 receives ACK frame 3R sent by the sending/receiving section 200 (S804). The sending/receiving section 100 may judge that DAT frame 3 has been successfully received by sending/receiving section 200, and may stop sending DAT frame 3R. In the manner described above, by continuously sending the most recently sent DAT frame when there is no more data to be sent, even if an error occurs in the transmission medium 42, the sending/receiving section 200 can quickly receive DAT frames in which the error occurs.

FIGS. 7 to 12 show sequences in which an error occurs during sending of transmission data from the sending/receiving section 100 to the sending/receiving section 200. The sequences shown in FIGS. 7 to 12 are executed in series in the order shown in the figures.

In FIGS. 7 to 12, "resend count information A" indicates resend count information included in the ACK frames received by the sending/receiving section 100, and "resend count information D" indicates resend count information included in the DAT frames sent by the sending/receiving section 100. In an initial state, the resend count information A and the resend count information D both have values of 0. Furthermore, "Idle" indicates a state in which frames are not being sent or received.

Figure 7:
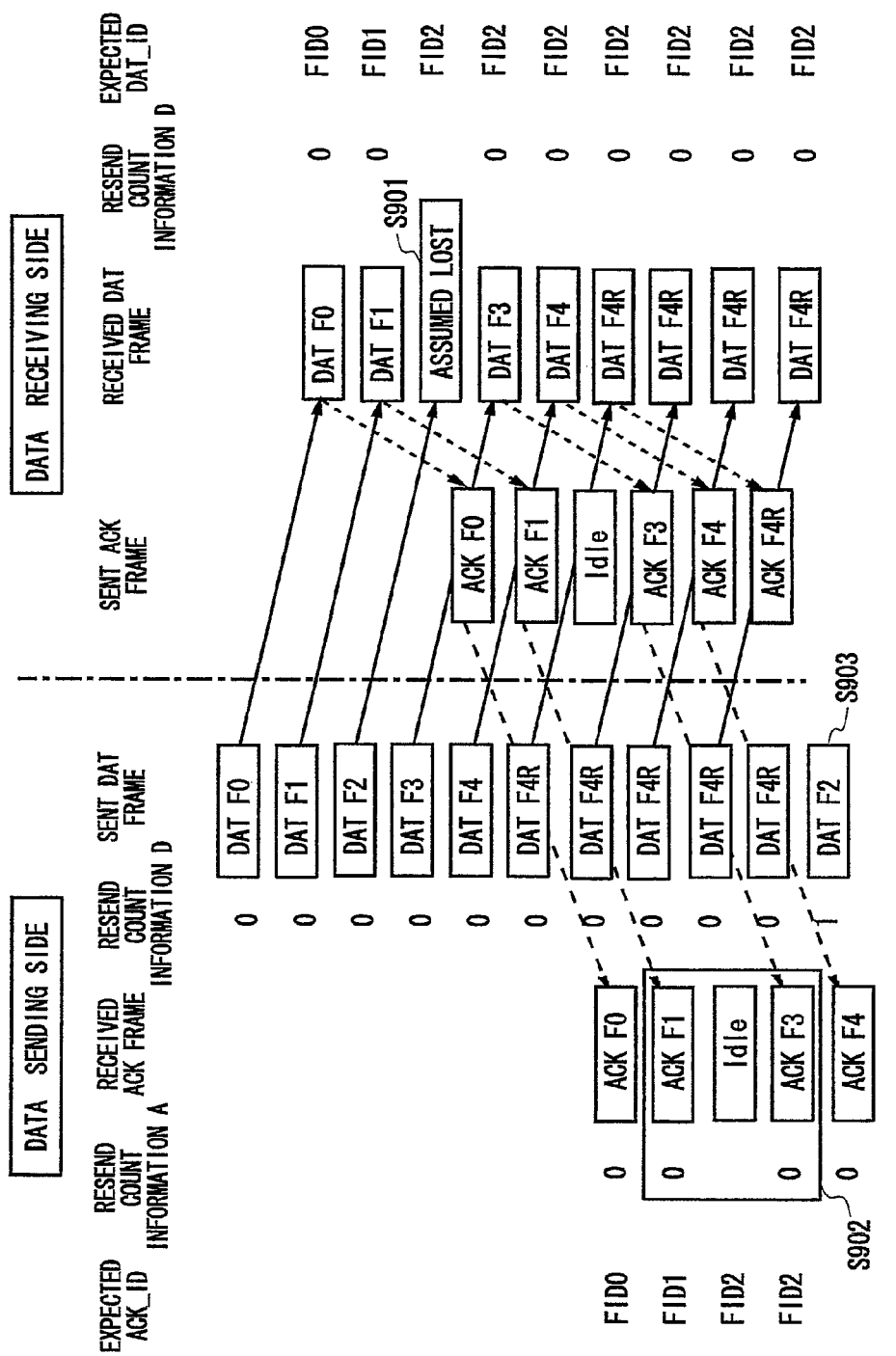
FIG. 7 shows a sequence in which an error occurs during sending of transmission data from the sending/receiving section 100 to the sending/receiving section 200.

The following describes the resending control based on resend count information, expected DAT_ID values, and expected ACK_ID values and according to the sequences of FIGS. 7 to 12. In FIG. 7, it is assumed that DAT frame 2 sent by the sending/receiving section 100 is lost in the transmission medium 42 (S901). In this case, the sending/receiving section 100 receives ACK frame 3 after receiving ACK frame 1 (S902). The frame receiving section 152 outputs, to the resending control section 136, the frame ID included in the received ACK frame and the resend count information A.

When the order of the received ACK frame is not the predetermined order and the value of the resend count information A in the received ACK frame has not increased from the value of the resend count information A in the previously received ACK frame, the resending control section 136 may judge that the sent DAT frame has been lost. For example, at S902, regardless of the expected ACK_ID having a value of 2, the frame ID of the received ACK frame has a value of 3 and the resend count information A stored in ACK frame 3 has not increased from that stored in ACK frame 1. Accordingly, the resending control section 136 may judge that DAT frame 2 has not been received by the sending/receiving section 200, and resend DAT frame 2.

The resending control section 136 reads the resend count information D stored in the resending information managing section 138, and acknowledges that the resend count information of DAT frame 2 has a value of 0. At this point, the resending control section 136 may update the resend count information managed by the resending information managing section 138 to have a value of 1.

Next, the resending control section 136 notifies the DAT frame sending section 130 that DAT frame 2 with resend count information having a value of 1 is being sent. Furthermore, the resending control section 136 instructs the address control section 140 to output the read address at which DAT frame 2 is stored. The DAT frame sending section 130 reads the data of DAT frame 2 stored in the sending data memory 128, and then resends DAT frame 2 with resend count information having a value of 1 to the sending/receiving section 200 (S903).

Figure 8:
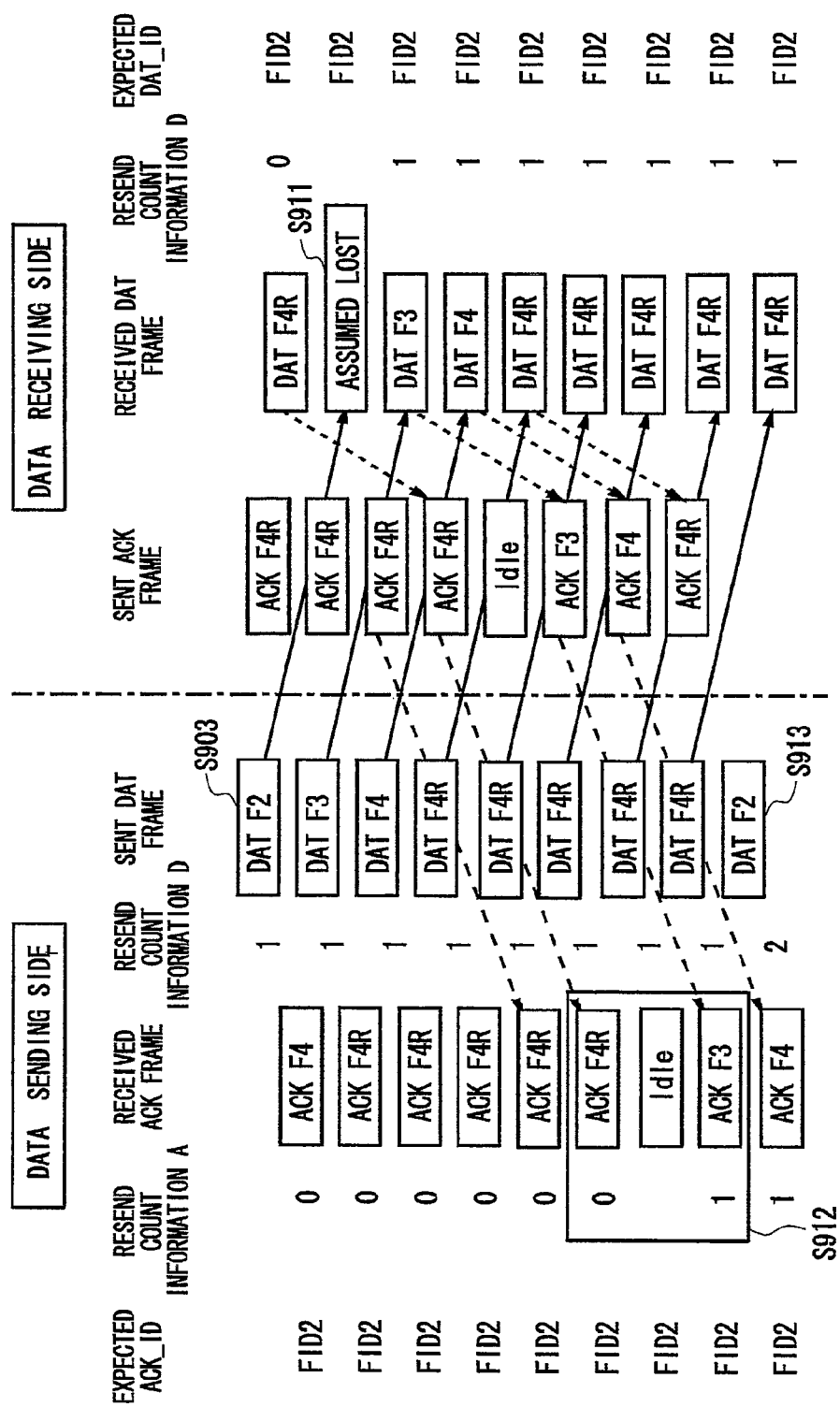
FIG. 8 shows a sequence in which an error occurs during sending of transmission data from the sending/receiving section 100 to the sending/receiving section 200.

In FIG. 8, it is assumed that DAT frame 2 resent by the sending/receiving section 100 is again lost in the transmission medium 42 (S911). In this case, after receiving ACK frame 4R having resend count information A with a value of 0, the sending/receiving section 100 receives ACK frame 3 having resend count value A with a value of 1 (S912).

When the value of the resend count information A in the received ACK frame has increased by 1 from the value of the resend count information A in the ACK frame received previously and the frame ID of the received ACK frame differs from the expected ACK_ID, the resending control section 136 may judge that the sent data frame has been lost. For example, at S912, the resend count information A of the received ACK frame 3 has a value of 1, which is 1 greater than the value of the resend count information A of ACK frame 4R received immediately before. The frame ID of ACK frame 3 has a value of 3, which is not equal to the expected ACK_ID value of 2. Accordingly, the resending control section 136 may judge that the resent ACK frame 2 has not been successfully received by the sending/receiving section 200. The resending control section 136 may control the DAT frame sending section 130 and the address control section 140 to send DAT frame 2 having resend count information with a value of 2 to the sending/receiving section 200 (S913).

Figure 9:
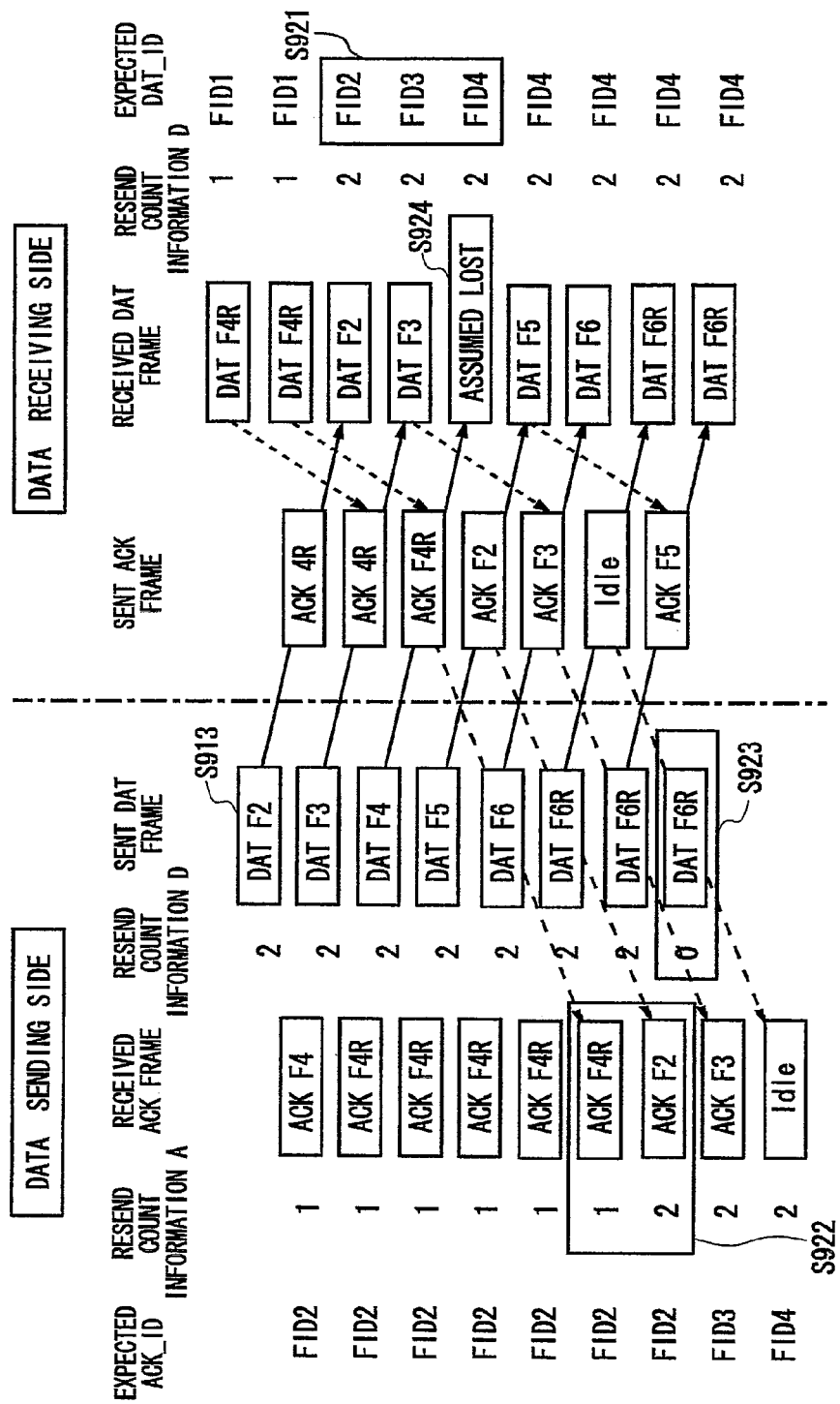
FIG. 9 shows a sequence in which an error occurs during sending of transmission data from the sending/receiving section 100 to the sending/receiving section 200.

In FIG. 9, it is assumed that the sending/receiving section 200 receives DAT frame 2 sent for the third time. Since the frame ID of the received DAT frame 2 has a value of 2 that is equal to the expected DAT_ID value 2, the sending/receiving section 200 may output the received data to the received data memory 254. Also, the sending/receiving section 200 may increase the expected DAT_ID value stored in the expected ID storage section 262 by 1 (S921).

The sending/receiving section 100 receives ACK frame 2 sent by the sending/receiving section 200 (S922). When the value of the resend count information A in the received ACK frame has increased by 1 from the value of the resend count information A in the ACK received previously and the frame ID of the received ACK frame is the same as the expected ACK_ID, the resending control section 136 may judge that the resent frame has been successfully received by the sending/receiving section 200.

For example, at S922, the resend count information A of ACK frame 4R received before ACK frame 2 has a value of 1, and the resend count information A of ACK frame 2 has a value of 2. Furthermore, the frame ID of ACK frame 2 has a value of 2, which is equal to the expected ACK_ID value of 2. Accordingly, the resending control section 136 may judge that the resent DAT frame 2 has been successfully received by the sending/receiving section 200. Upon judging that the resent frame has been successfully received by the sending/receiving section 200, the resending control section 136 may update the resend count information D managed by the resending information managing section 138 to have a value of 0 (S923).

Figure 10:
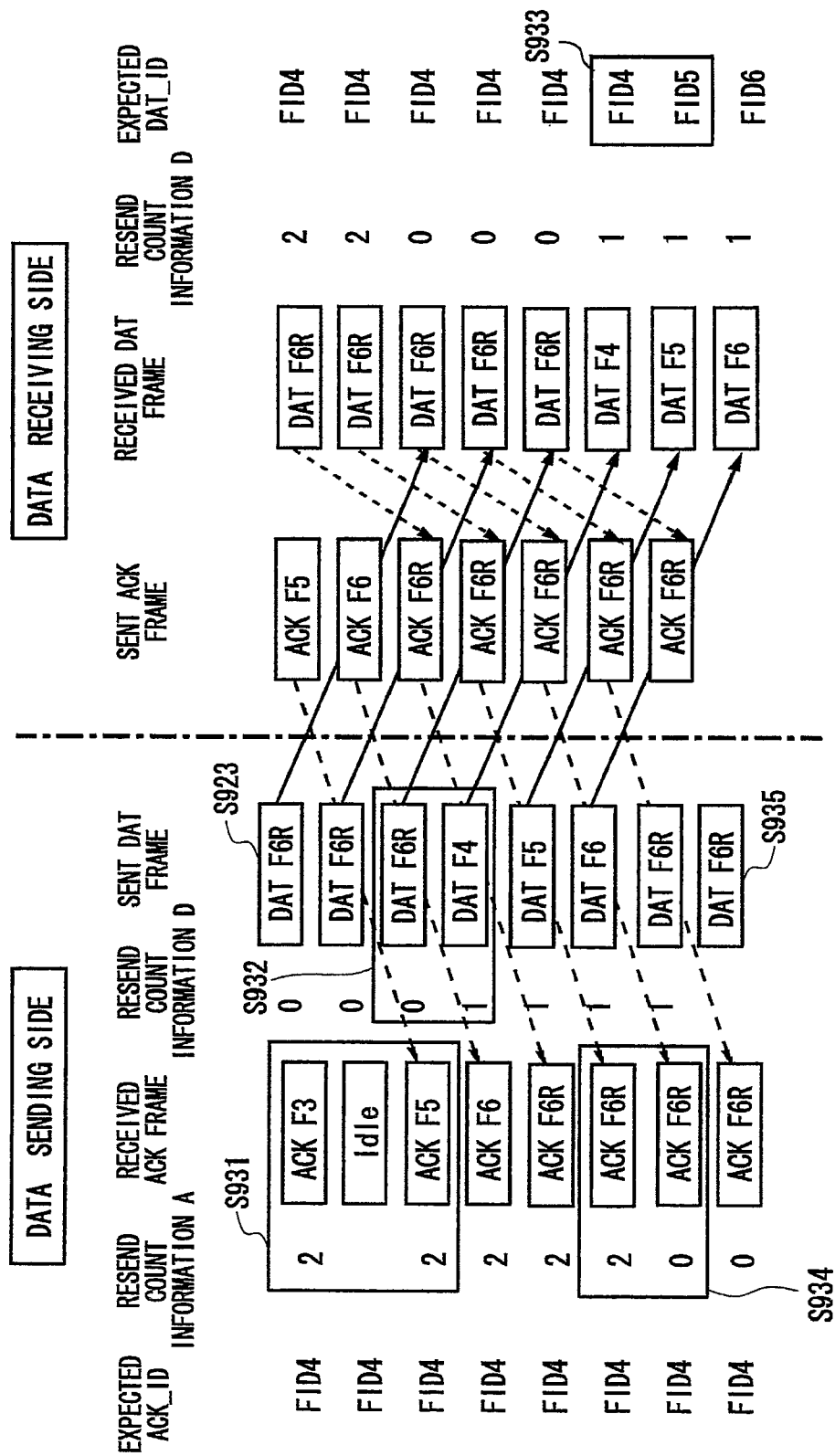
FIG. 10 shows a sequence in which an error occurs during sending of transmission data from the sending/receiving section 100 to the sending/receiving section 200.

Here, it is assumed that DAT frame 4 sent by the sending/receiving section 100 is lost in the transmission medium 42 (S924). In this case, since the sending/receiving section 100 receives ACK frame 5 following ACK frame 3, as shown in FIG. 10, the resending control section 136 judges that ACK frame 4 was lost (S931). Therefore, the resending control section 136 controls the DAT frame sending section 130 and the address control section 140 to resend DAT frame 4 with resend count information D having a value of 1 (S932).

The sending/receiving section 200 receives the resent DAT frame 4. The frame ID value of the received DAT frame 4 is equal to the expected DAT_ID value of 4. Therefore, the sending/receiving section 200 outputs the received data to the received data memory 254 and then updates the expected DAT_ID stored in the expected ID storage section 262 to have a value of 5 (S933).

At S934, the sending/receiving section 100 receives ACK frame 6 having resend count information A with a value of 2 and ACK frame 6R having resend count information A with a value of 0. The frame ID of the received ACK frame 6R differs from the expected ACK_ID. In this case, if the value of the resend count information A in the received ACK frame has not increased and the frame ID of the received ACK frame is the same as the frame ID of the ACK frame received immediately before, the resending control section 136 may judge that an error has not occurred.

Figure 11:
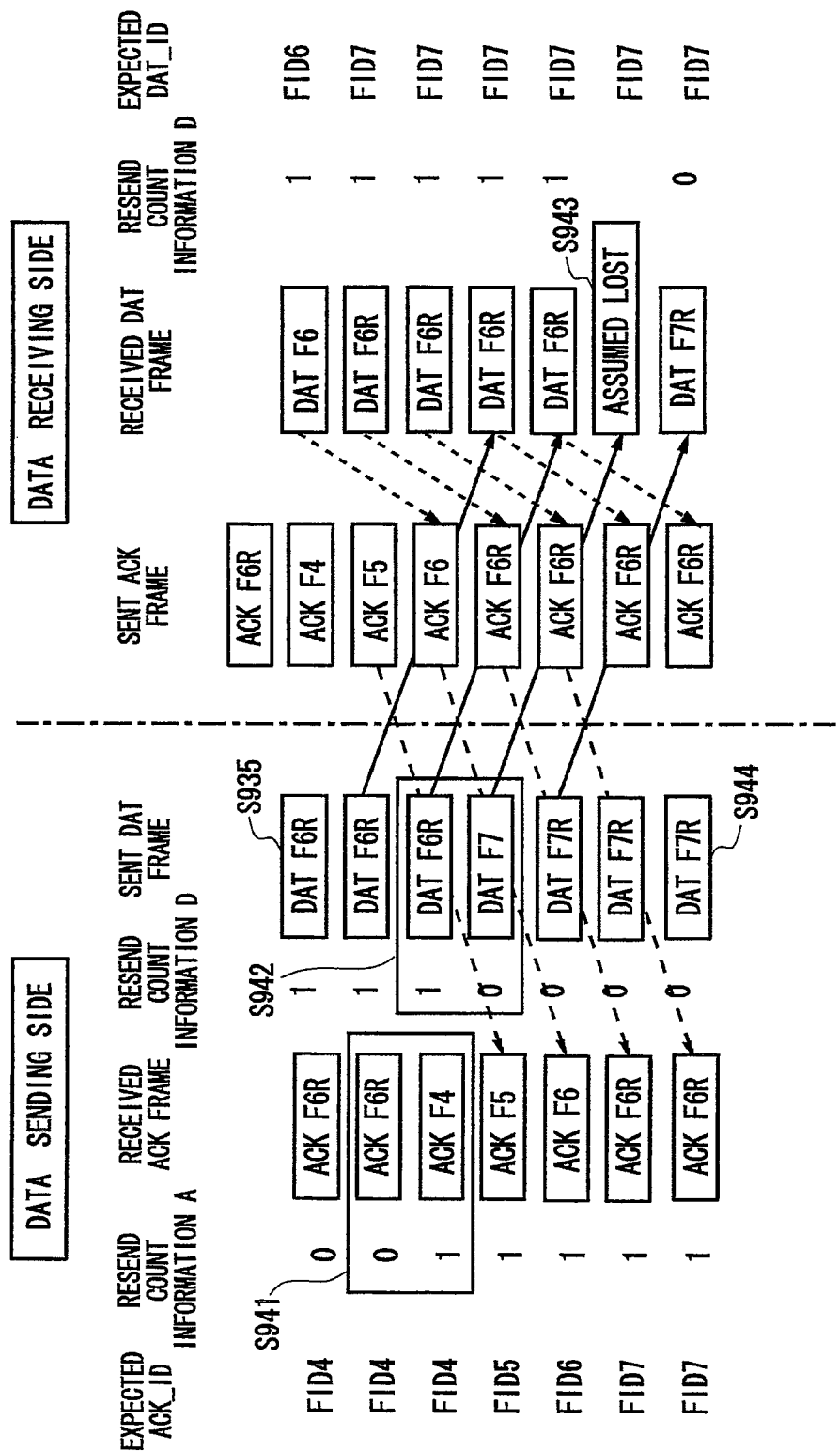
FIG. 11 shows a sequence in which an error occurs during sending of transmission data from the sending/receiving section 100 to the sending/receiving section 200.
Figure 12:
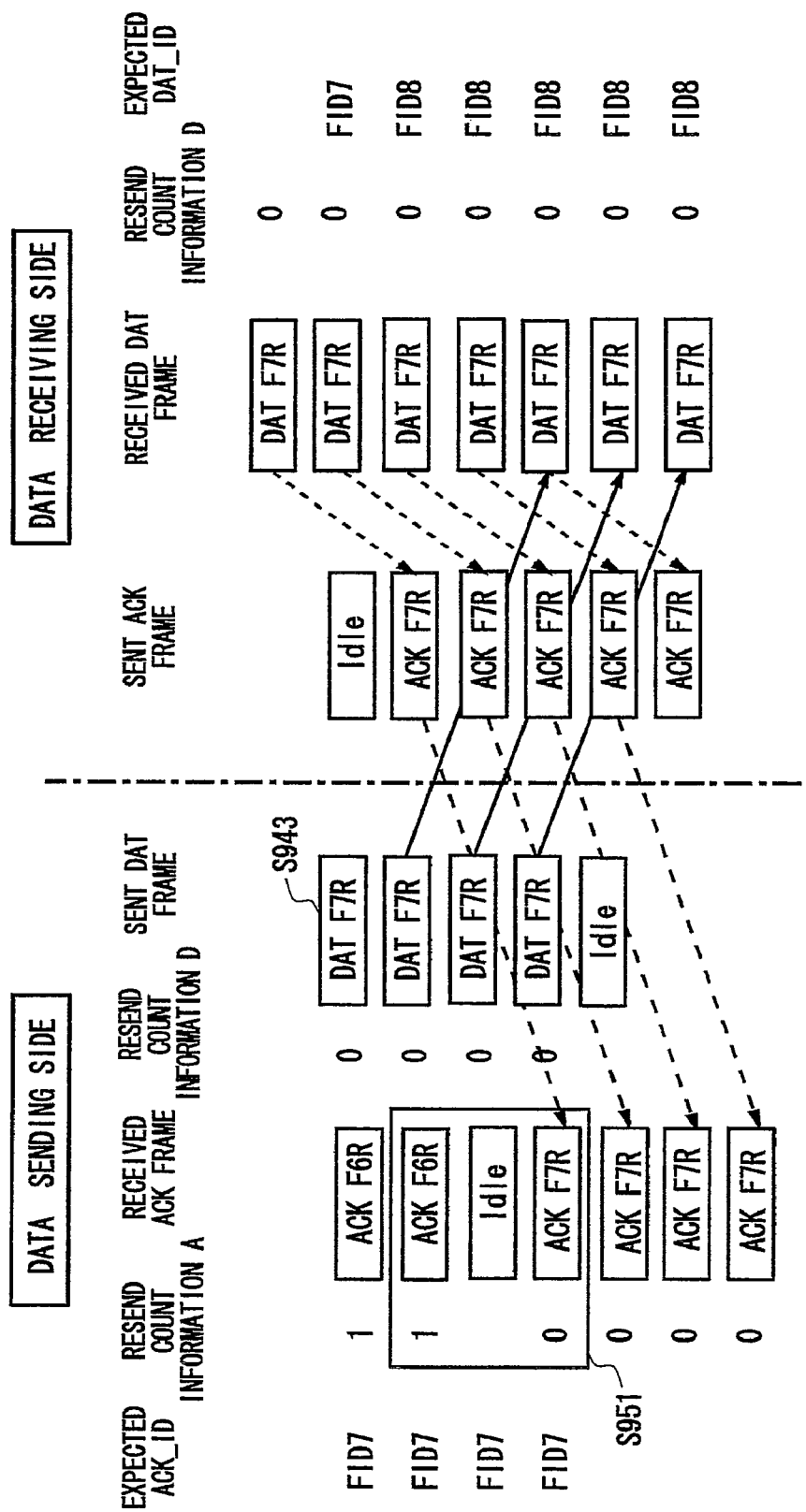
FIG. 12 shows a sequence in which an error occurs during sending of transmission data from the sending/receiving section 100 to the sending/receiving section 200.

As shown in FIG. 11, the sending/receiving section 100 receives ACK frame 4 (S941). The received ACK frame 4 has a frame ID that is the same as the expected ACK_ID and has resend count information with an increased value. Accordingly, the resending control section 136 may judge that DAT frame 4 resent at S932 has been successfully received by the sending/receiving section 200. At this point, the resending control section 136 may reset the resend count information D to have a value of 0, and then control the DAT frame sending section 130 and the address control section 140 to send DAT frame 7 (S942).

Here, it is assumed that DAT frame 7 sent by the sending/receiving section 100 is lost in the transmission medium 42 (S943). In this case, as shown at S951 of FIG. 12, the sending/receiving section 100 receives ACK frame 7R following ACK frame 6. The resend count information A of the received ACK frame 7 has a value of 0, which has decreased from the value of 1 of the resend count information A of ACK frame 6R received immediately before. The frame ID of the ACK frame 7R has a value of 7, which is equal to the expected ACK_ID value.

Accordingly, the resending control section 136 may judge that DAT frame 7 has been successfully received by the sending/receiving section 200. In this way, by continuously sending the same frame when there is no more data to be sent, even when there is a lost data frame, the sending/receiving section 100 enables the transmission data to be successfully received by the sending/receiving section 200 without resending the lost data frame.

Figure 13:
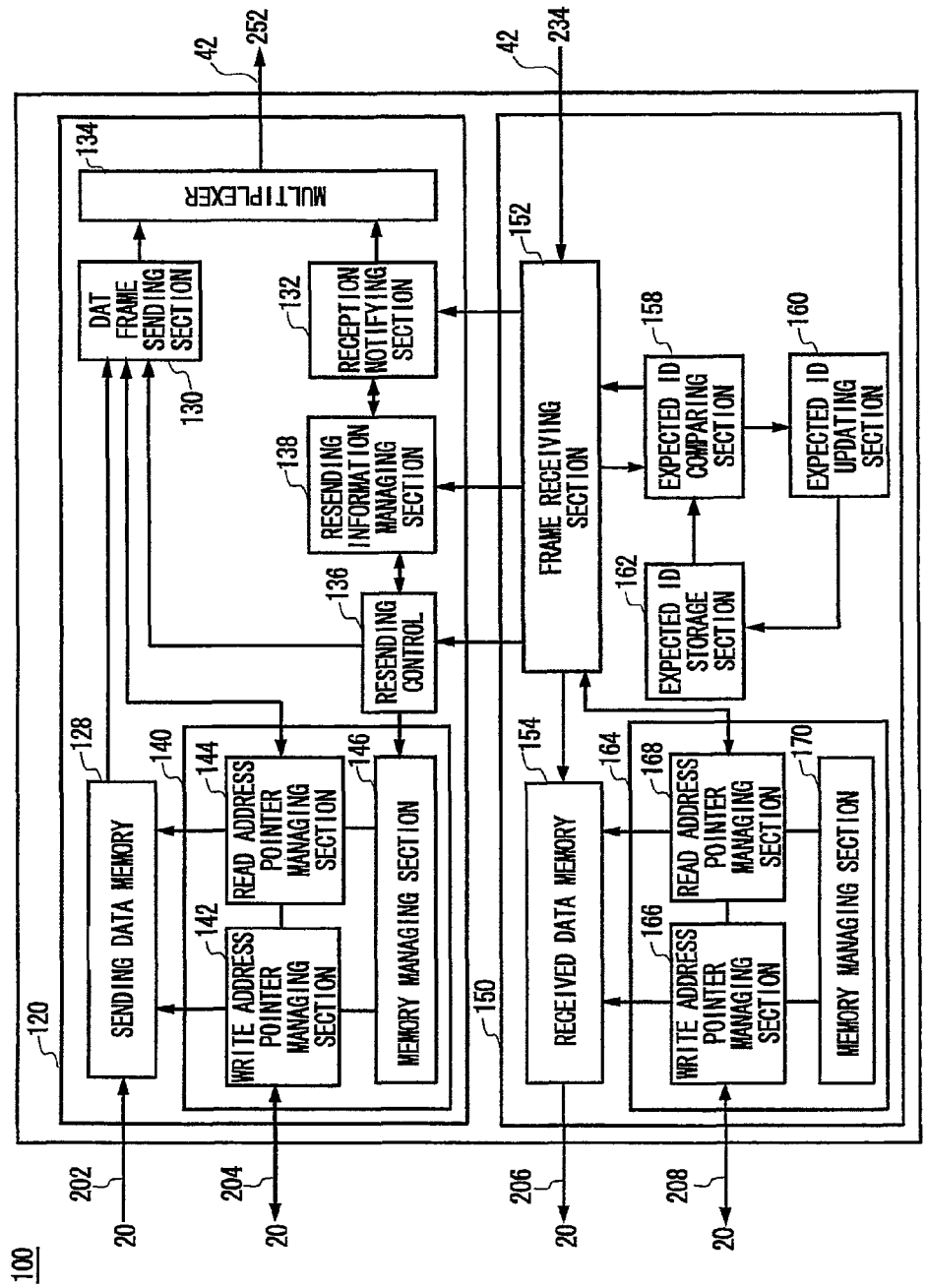
FIG. 13 shows a second configuration of the sending/receiving section 100.

FIG. 13 shows a second configuration of the sending/receiving section 100. The address control section 140 includes a write address pointer managing section 142, a read address pointer managing section 144, and a memory managing section 146. The address control section 164 includes a write address pointer managing section 166, a read address pointer managing section 168, and a memory managing section 170.

The write address pointer managing section 142 manages a write address pointer, which indicates addresses of the sending data memory 128 to which the control section 20 writes data. The write address pointer managing section 142 may manage write addresses in the sending data memory 128 in frame units. For example, the write address pointer managing section 142 may add a write address for each frame-amount of data written by the control section 20.

The read address pointer managing section 144 manages a read address pointer, which indicates addresses of the sending data memory 128 from which the DAT frame sending section 130 reads data. The read address pointer managing section 144 may manage read addresses in the sending data memory 128 in frame units. For example, the read address pointer managing section 144 may add a read address for each frame-amount of data read by the DAT frame sending section 130.

The address control section 164 includes the write address pointer managing section 166, the read address pointer managing section 168, and the memory managing section 170. The write address pointer managing section 166 manages a write address pointer, which indicates addresses of the received data memory 154 to which the frame receiving section 152 writes data. The write address pointer managing section 166 may manage write addresses in the received data memory 154 in frame units. For example, the write address pointer managing section 166 may add a write address for each frame-amount of data written by the frame receiving section 152.

The read address pointer managing section 168 manages a read address pointer, which indicates addresses of the received data memory 154 from which the control section 20 reads data. The read address pointer managing section 168 may manage read addresses in the received data memory 154 in frame units. For example, the read address pointer managing section 168 may add a read address for each frame-amount of data read by the control section 20.

Figure 14:
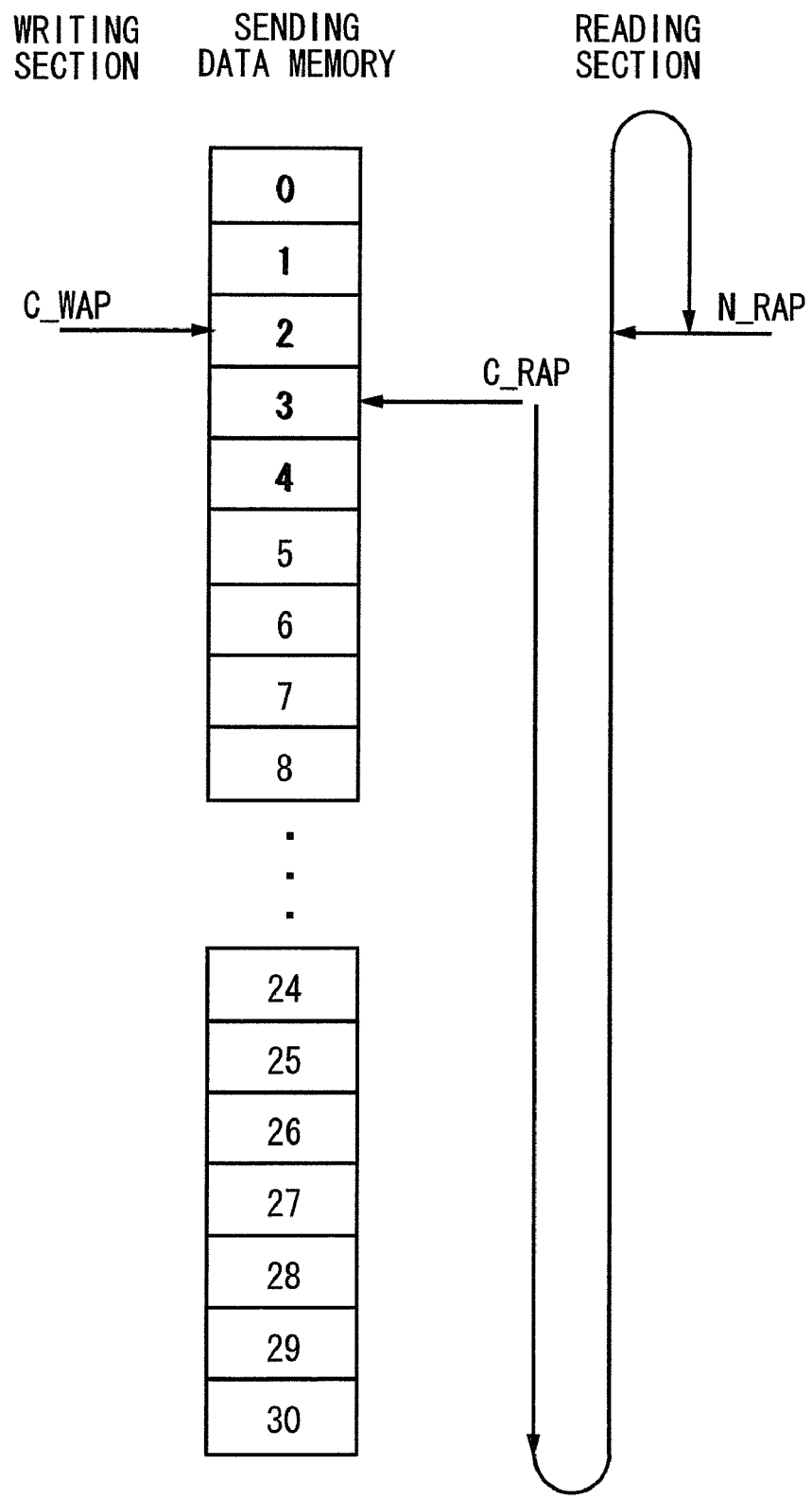
FIG. 14 shows a control method for writing to the sending data memory 128.

FIG. 14 shows a relationship between the write address pointer and the read address pointer when transmission data is written to the sending data memory 128. In FIG. 14, C_WAP represents the write address pointer, and C_RAP represents the read address pointer. The write address pointer managing section 142 increases the write address pointer in increments of 1 until the write address pointer reaches the address one address lower than the address indicated by the read address pointer, i.e. the address indicated by N_WAP. When the control section 20 writes transmission data to the sending data memory 128, the write address pointer managing section 142 may incrementally increase the write address in the sending data memory 128 and, when the write address reaches the prescribed final address, may loop the write address back to a prescribed initial address.

For example, when the write address pointer indicates address 30 and the read address pointer indicates address 3 as shown in FIG. 14, the write address pointer managing section 142 controls the address pointer such that the control section 20 writes the transmission data from address 30. When the control section 20 has written one frame of transmission data onto address 30, the write address pointer managing section 142 may increase the write address pointer by 1 address, thereby looping to address 0. The write address pointer managing section, 142 may then incrementally increase the write address pointer to address 2, and stop the increase at this address. The write address pointer managing section 142 may output a write-stop signal to the control section 20.

The write address pointer managing section 142 may control the address to continuously write frames of transmission data up to at most "the number of total addresses minus one" from the write address pointer. In the present embodiment, the sending data memory 128 has 31 addresses, and therefore the DAT frame sending section 130 may read 30 frames of transmission data.

Figure 15:
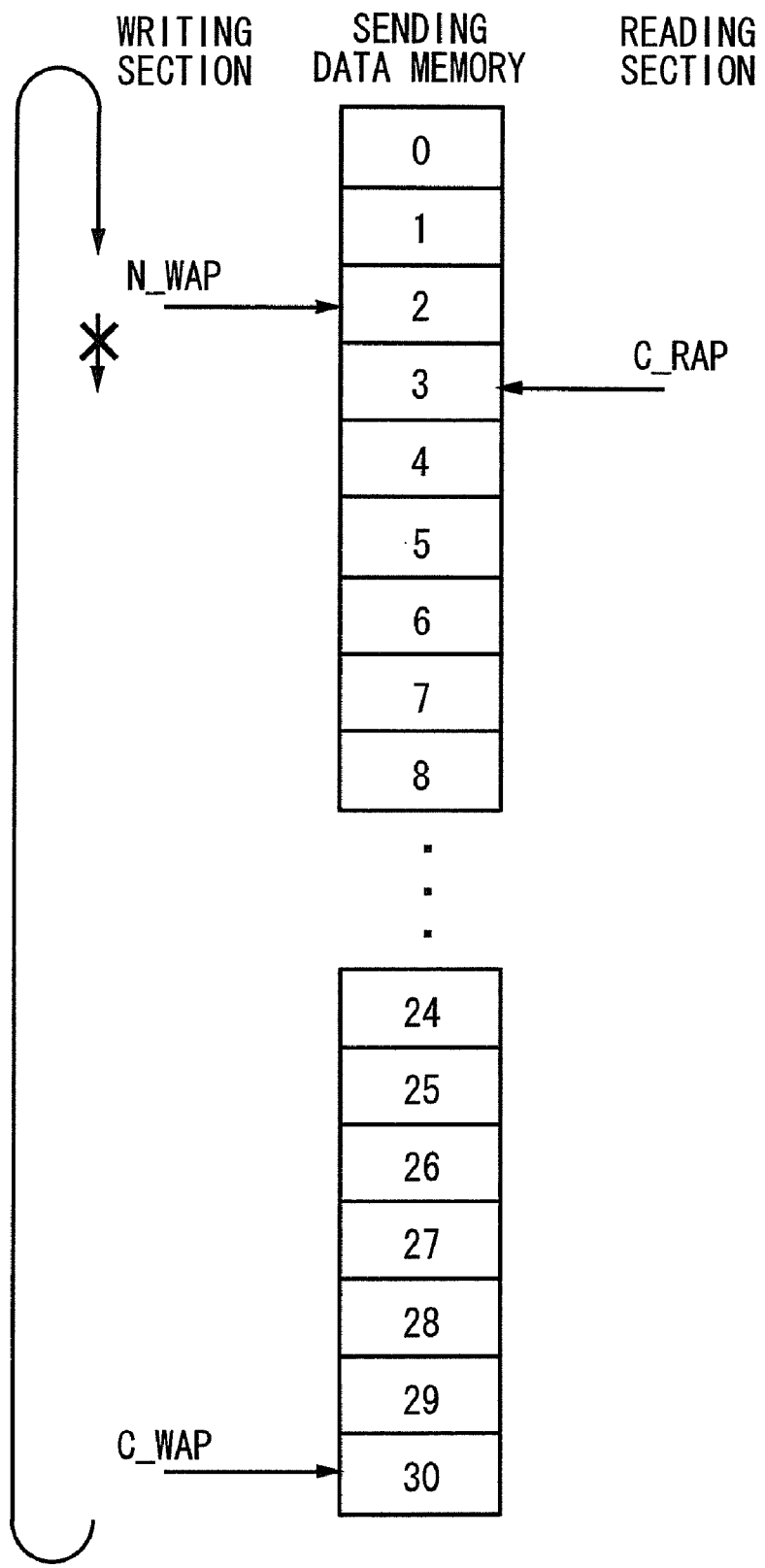
FIG. 15 shows a control method for reading from the sending data memory 128.

FIG. 15 shows a relationship between the write address pointer and the read address pointer when transmission data is read from the sending data memory 128. In FIG. 15, C_WAP represents the position of write address pointer, which indicates the address to which the next frame of transmission data will be written, and C_RAP represents the position of the read address pointer. The read address pointer managing section 144 increases the read address pointer in increments of 1 until the read address pointer reaches the address one increment lower than the address indicated by the write address pointer, i.e. the address indicated by N_RAP.

When the DAT frame sending section 130 reads transmission data from the sending data memory 128, the read address pointer managing section 144 may incrementally increase the read address in the sending data memory 128 and, when the read address reaches the prescribed final address, may loop the read address back to a prescribed initial address. For example, when the write address pointer indicates address 2 and the read address pointer indicates address 3, the read address pointer managing section 144 increases the read address pointer by 1 each time the DAT frame sending section 130 reads one frame of transmission data. When the read address pointer reaches address 30, the read address pointer managing section 144 may loop the read address pointer back to address 0 and continue incrementally increasing the address pointer until reaching address 2.

The read address pointer managing section 144 may control the address to continuously read frames of transmission data up to at most "the number of total addresses minus one" from the read address pointer. In the present embodiment, the sending data memory 128 has 31 addresses, and therefore the DAT frame sending section 130 may read 30 frames of transmission data.

The memory managing section 146 manages a number of unreceived pieces of transmission data stored in the sending data memory 128, which are pieces of data that have yet to be received by the sending/receiving section 200. When the order in which the DAT frame is received by the sending/receiving section 200 as indicated by the received ACK frame is the same as the predetermined order, the memory managing section 146 may subtract a prescribed value from the number of pieces of unreceived transmission data. For example, assume that the memory managing section 146 manages 5 pieces of unreceived transmission data. In this case, upon receiving notification from the resending control section 136 to acknowledge that one frame has been successfully received by the sending/receiving section 200, the memory managing section 146 may decrease the number of pieces of unreceived transmission data to 4.

The write address pointer managing section 142 may incrementally increase the write address pointer until the number of pieces of unreceived transmission data managed by the memory managing section 146 reaches the number of addresses in the sending data memory 128. For example, when the sending data memory 128 has 31 frames of addresses, the write address pointer managing section 142 may increase the write address pointer in increments of 1 until the number of DAT frames received by the sending/receiving section 200 reaches 31.

The write address pointer managing section 142 and the read address pointer managing section 144 may control the read addresses and the write addresses such that the these addresses to not overlap at the same time. For example, when the write address pointer is at address 10 and the read address pointer is at address 5, the readable transmission data is stored in addresses 5 to 9. Here, upon receiving a read signal from the DAT frame sending section 130, the read address pointer managing section 144 may be controlled to sequentially change the addresses from 5 to 9, and to not output addresses beyond address 9.

In the same way, when the read address pointer is at 10 and the write address pointer is at 5, the DAT frame sending section 130 has already sent the transmission data stored in addresses 5 to 9. Accordingly, upon receiving a write signal from the serial transmitting section 40, the write address pointer managing section 142 may be controlled to sequentially change the addresses from 5 to 9, and to not output addresses beyond address 9.

If the number of pieces of transmission data not yet received by the sending/receiving section 200 exceeds the number of addresses in the sending data memory 128, transmission data sent to the sending/receiving section 200 will be lost. Therefore, the write address pointer managing section 142 is desirably controlled to safely store the transmission data not yet received by the sending/receiving section 200. For example, the write address pointer managing section 142 may incrementally increase the write address until the number of pieces of unreceived transmission data managed by the memory managing section 146 reach 1 less than the number of addresses in the sending data memory 128.

Figure 16:
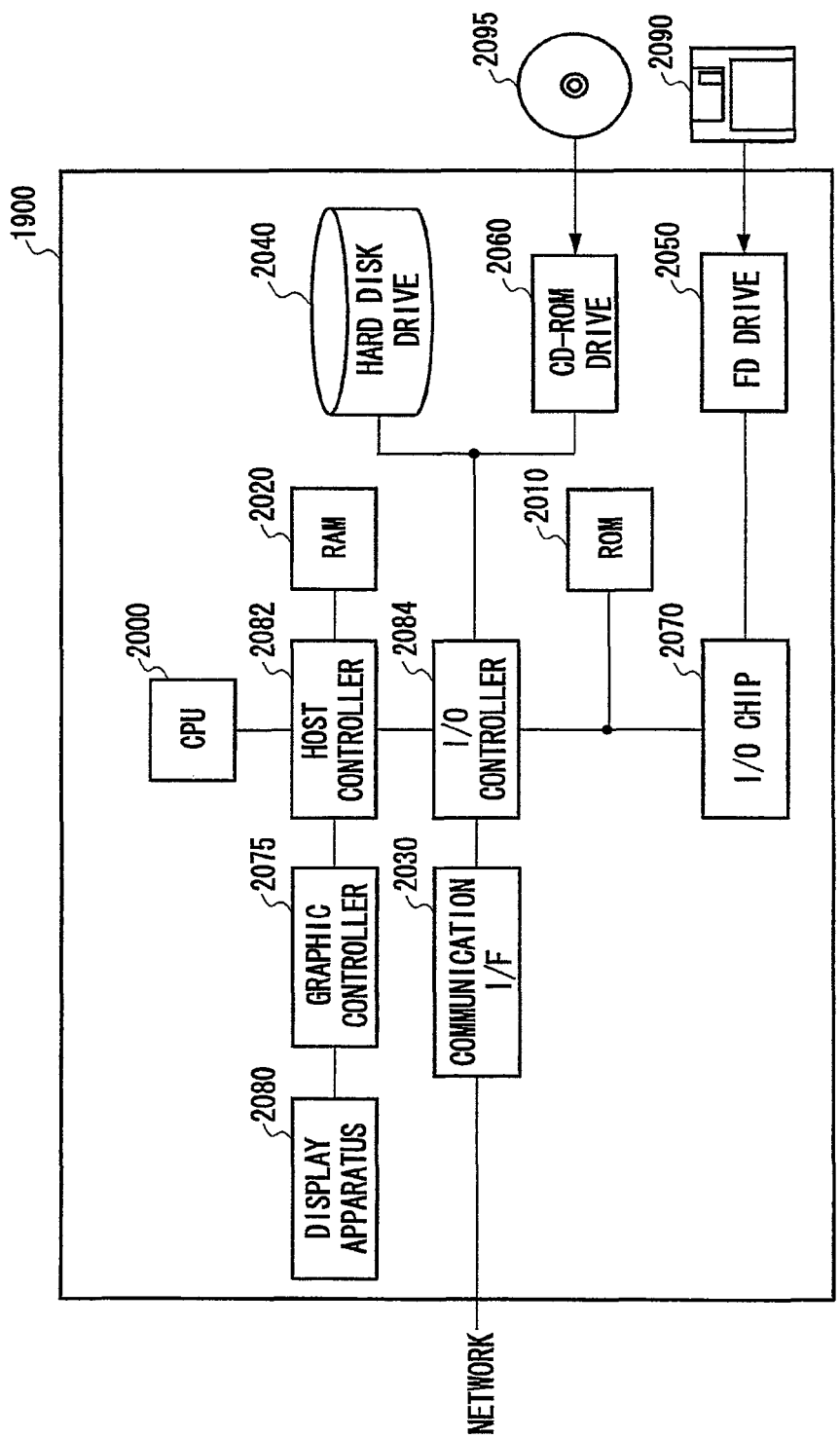
FIG. 16 shows an example of a hardware configuration of a computer 1900 according to a second embodiment.

FIG. 16 shows an example of a hardware configuration of a computer 1900 according to a second embodiment. The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a measurement interface 2032, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. In addition, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a storage medium, such as the flexible disk 2090, the CD-ROM 2095, or an IC card, and provided by a user. The programs are read from storage medium, installed in the hard disk drive 2040 inside the computer 1900 via the RAM 2020, and performed by the CPU 2000.

The programs installed in the computer 1900 to make the computer 1900 function as the semiconductor test apparatus 10 cause the computer 1900 to function as the control section 20, the test unit 30, and the serial transmitting section 40. These programs provided the computer 1900 with (i) a data sending module on the transmission side that sends pieces of transmission data in a predetermined order, (ii) a reception notification module on the reception side that, upon receiving transmission data, sends an acknowledgement signal indicating that the transmission data has been received to the transmission side, (iii) a resend control module that, when the reception order of the transmission data as indicated by the acknowledgement signal differs from the predetermined order, attaches resend count information, indicating whether the data is resent, to the pieces of transmission data beginning with the piece of transmission data that is received in the order differing from the predetermined order, and resends the pieces of transmission data to the reception side, and (iv) an expected acknowledgement ID storage module that stores an expected acknowledgement ID indicating identification data that should be attached to the acknowledgement signal received on the transmission side. These programs and modules prompt the CPU 2000 or the like to make the computer 1900 function as the semiconductor test apparatus 10.

The information processes recorded in these programs are read by the computer 1900 to cause the computer 1900 to function as software and hardware described above, which are exemplified by the specific sections of the DAT frame sending section 130, the reception notifying section 132, the resending control section 136, and the resending information managing section 138. With these specific sections, a unique semiconductor test apparatus 10 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disc 2040, the flexible disk 2090, or the CD-ROM 2095, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk 2040, the CD-ROM drive 2060, the CD-ROM 2095, the flexible disk drive 2050, or the flexible disk 2090. The CPU 2000 writes the processed data back to the external apparatus through DMA transmission or the like.

In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the prescribed condition by reading the second type of value stored at the same entry.

The programs and modules shown above may also be stored in an external storage medium. The flexible disk 2090, the CD-ROM 2095, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable performing, in data transmission in a semiconductor test apparatus, a resend control based on resend count information and an expected acknowledgement ID, thereby decreasing the necessary circuit size and buffer size.

What is claimed is:

1. A test apparatus that tests a device under test, comprising:
    a test unit that is electrically connected to the device under test and tests the device under test;
    a control section that controls the test unit; and
    a serial transmitting section that transmits transmission data back and forth between the control section and the test unit, wherein
    the serial transmitting section includes:
        a data sending section, provided on a transmission side, that sends a plurality of pieces of the transmission data in a predetermined order;
        a reception notifying section that, when a piece of the transmission data is received on a reception side, attaches identification data to an acknowledgement frame indicating that the piece of transmission data has been received, and sends the acknowledgement frame to the transmission side;
        a resending control section that, when a reception order of pieces of transmission data as indicated by the acknowledgement frames differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and
        an expected acknowledgement ID storage section that stores an expected acknowledgement ID indicating the identification data that is expected to be attached to the acknowledgement frame received on the transmission side, the reception notifying section attaches, to the acknowledgement frame to be sent in response to the received piece of transmission data, the resend count information of the piece of transmission data, and sends the acknowledgement frame to the transmission side, and when the reception order of a piece of transmission data as indicated by the acknowledgment signal differs from the predetermined order, the resending control section does not resend the piece of transmission data if (i) the resend count information indicates that the piece of transmission data is resent data and (ii) the identification data attached to the acknowledgment signal is the same as the expected acknowledgement ID.

2. The test apparatus according to claim 1, wherein when the reception order of the piece of transmission data as indicated by the acknowledgment signal differs from the predetermined order, the resending control section resends the piece of transmission data if the identification data attached to the acknowledgment signal is different from the expected acknowledgement ID.

3. The test apparatus according to claim 2, wherein when the resending control section judges that (i) the reception order of the piece of transmission data as indicated by the acknowledgement frame differs from the predetermined order and (ii) the piece of transmission data corresponding to the acknowledgement frame differs from a piece of transmission data corresponding to the expected acknowledgement ID, the resending control section generates resend count information indicating a number of times that the piece of transmission data has been resent.

4. The test apparatus according to claim 3, wherein when the number of resends indicated by the resend count information exceeds a predetermined threshold value, the serial transmitting section stops sending the piece of transmission data.

5. The test apparatus according to claim 4, wherein upon receiving the acknowledgment signal indicating that the piece of transmission data corresponding to the expected acknowledgement ID has been received, the resending control section resets the number of resends indicated by the resend count information to an initial value.

6. The test apparatus according to claim 3, wherein when a subsequent piece of transmission data to be sent is not provided to the data sending section, the resending control section continuously resends, to the reception side, the most recently sent piece of transmission data, until the subsequent piece of transmission data to be sent is provided to the data sending section.

7. The test apparatus according to claim 6, wherein the serial transmitting section further includes a data receiving section that, when a piece of transmission data having identification data that is the same as the identification data of the acknowledgement frame sent by the reception notifying section is received again on the reception side, deletes the piece of transmission data received again, and the reception notifying section sends, to the transmission side, the acknowledgement frame of the piece of transmission data received again.

8. The test apparatus according to claim 7, wherein the data sending section changes the identification data attached to each piece of transmission data sent sequentially, according to a predetermined rule, and when the identification data of the received piece of transmission data differs from the identification data determined according to the predetermined rule, the data receiving section stops output of the piece of transmission data to a later-stage circuit.

9. The test apparatus according to claim 8, wherein when a piece of transmission data having the identification data determined according to the predetermined rule is received, the data receiving section restarts output of the piece of transmission data to the later-stage circuit.

10. The test apparatus according to claim 9, wherein the serial transmitting section further includes:
an expected data ID storage section that stores an expected data ID of the identification data to be attached to the transmission data received on the reception side;
a data ID comparing section that compares (i) the identification data attached to the transmission data received on the reception side to (ii) the expected data ID stored in the expected data ID storage section; and
an expected data ID updating section that, when the identification data attached to the transmission data received on the reception side is the same as the expected data ID stored in the expected data ID storage section, updates the expected data ID stored in the expected data ID storage section based on the predetermined rule.

11. The test apparatus according to claim 10, wherein the serial transmitting section further includes:
an acknowledgement ID comparing section that compares (i) the identification data attached to the acknowledgement frame received on the transmission side to (ii) the expected acknowledgement ID stored in the expected acknowledgement ID storage section; and
an expected acknowledgement ID updating section that, when the identification data attached to the acknowledgement frame received on the transmission side is the same as the expected acknowledgement ID stored in the expected acknowledgement ID storage section, updates the expected acknowledgement ID stored in the expected acknowledgement ID storage section based on the predetermined rule.

12. The test apparatus according to claim 11, wherein when the reception order of a piece of transmission data as indicated by the acknowledgment signal differs from the predetermined order, the resending control section resets the number of resends indicated by the resend count information to an initial value if (i) the resend count information attached to the acknowledgement frame is incrementally increased relative to the resend count information attached to the acknowledgement frame received immediately prior and (ii) an identification signal indicated by the acknowledgement frame is the same as the expected acknowledgement ID stored in the expected acknowledgement ID storage section.

13. The test apparatus according to claim 11, wherein when the reception order of a piece of transmission data as indicated by the acknowledgment signal differs from the predetermined order, the resending control section resends the piece of transmission data if the resend count information attached to the acknowledgement frame has not increased incrementally relative to the resend count information attached to the acknowledgement frame received immediately prior.

14. The test apparatus according to claim 11, wherein when the reception order of a piece of transmission data as indicated by the acknowledgment signal differs from the predetermined order, the resending control section resends the piece of transmission data if (i) the resend count information attached to the acknowledgement frame has increased incrementally relative to the resend count information attached to the acknowledgement frame received immediately prior and (ii) an identification signal indicated by the acknowledgement frame is different from the expected acknowledgement ID stored in the expected acknowledgement ID storage section.

15. The test apparatus according to claim 1, wherein
the serial transmitting section attaches identification data identifying the piece of transmission data to each piece of transmission data, and transmits the pieces of transmission data, and
the reception notifying section sends, to the transmission side, the acknowledgement frames containing the identification data of the received pieces of transmission data.

16. The test apparatus according to claim 1, wherein the data sending section includes:
a data memory that is provided on the transmission side, has a plurality of addresses, writes supplied transmission data to a writable address, and outputs transmission data from a designated read address; and
an address control section that, when the reception order of a piece of transmission data as indicated by the acknowledgement frame received on the transmission side differs from the predetermined order, controls an address of the data memory at which the piece of transmission data corresponding to the acknowledgement frame is stored to be a writable address.

17. The test apparatus according to claim 16, wherein
the address control section includes:
a write address pointer managing section that, when the transmission data is written to the data memory, incrementally increases a write address of the data memory and, if the write address has reached a prescribed final address, loops the write address back to a prescribed initial address; and
a memory managing section that manages a number of pieces transmission data stored in the data memory that have yet to be received,
the write address pointer managing section incrementally increases the write address until the number of pieces of transmission data yet to be received, which is managed by the memory managing section, reaches a number corresponding to a total number of the address in the data memory, and
when the reception order of a piece of transmission data as indicated by the received acknowledgment signal differs from the predetermined order, the memory managing section subtracts a prescribed value from the number of pieces of transmission data yet to be received.

18. The test apparatus according to claim 17, wherein
the address control section further includes a read address pointer managing section that incrementally increases the read address of the data memory when the transmission data is read from the data memory, and loops the read address to a prescribed initial address if the read address has reached a prescribed final address, and
the write address pointer managing section and the read address pointer managing section control the write address and the read address such that the write address and the read address are different.

19. The test apparatus according to claim 18, wherein the write address pointer managing section incrementally increases the write address until the number of pieces of transmission data yet to be received, which is managed by the memory managing section, reaches a number corresponding to one less than a total number of the addresses in the data memory.

20. A transmission system, comprising:
a data sending section, provided on a transmission side, that sends a plurality of pieces of transmission data in a predetermined order;
a reception notifying section that, when a piece of the transmission data is received on a reception side, attaches identification data to an acknowledgement frame indicating that the piece of transmission data has been received, and sends the acknowledgement frame to the transmission side;
a resending control section that, when a reception order of the pieces of transmission data as indicated by the acknowledgement frames differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and
an expected acknowledgement ID storage section that stores an expected acknowledgement ID indicating the identification data that is expected to be attached to the acknowledgement frame received on the transmission side, wherein
the reception notifying section attaches, to the acknowledgement frame to be sent in response to the received piece of transmission data, the resend count information of the piece of transmission data, and sends the acknowledgement frame to the transmission side, and
when the reception order of the piece of transmission data as indicated by the acknowledgment signal differs from the predetermined order, the resending control section does not resend the piece of transmission data if (i) the resend count information indicates that the piece of transmission data is resent data and (ii) the acknowledgement data attached to the acknowledgment signal is the same as the expected acknowledgement ID.

21. A computer program product having computer instructions, recorded on a non-transitory computer readable medium, for enabling a computer executing the computer instructions to function as a test apparatus for testing a device under test, the test apparatus comprising:
a test unit that is electrically connected to the device under test and tests the device under test;
a control section that controls the test unit; and
a serial transmitting section that transmits transmission data back and forth between the control section and the test unit, the serial transmitting section comprising:
a data sending section, provided on a transmission side, that sends a plurality of pieces of the transmission data in a predetermined order;
a reception notifying section that, when a piece of the transmission data is received on a reception side, attaches identification data to an acknowledgement frame indicating that the piece of transmission data has been received, and sends the acknowledgement frame to the transmission side;
a resending control section that, when a reception order of the pieces of transmission data as indicated by the acknowledgement frames differs from the predetermined order, attaches resend count information, indicating whether a piece of the transmission data is resent data, to the pieces of transmission data beginning with the piece of transmission data that is received in the reception order differing from the predetermined order, and resends the pieces of transmission data to the reception side; and an expected acknowledgement ID storage section that stores an expected acknowledgement ID indicating the identification data that is expected to be attached to the acknowledgement frame received on the transmission side, the reception notifying section attaches, to the acknowledgement frame to be sent in response to the received piece of transmission data, the resend count information of the piece of transmission data, and sends the acknowledgement frame to the transmission side, and when the reception order of the piece of transmission data as indicated by the acknowledgment signal differs from the predetermined order, the resending control section does not resend the piece of transmission data if (i) the resend count information indicates that the piece of transmission data is resent data and (ii) the acknowledgement data attached to the acknowledgment signal is the same as the expected acknowledgement ID.

22. The non-transitory computer readable medium storing thereon the computer instructions of the computer program product according to claim 21.

* * * * *